United States Patent
Khoshnevisan et al.

(10) Patent No.: US 12,267,843 B2
(45) Date of Patent: Apr. 1, 2025

(54) DEFAULT BEAM FOR CROSS-CARRIER SCHEDULING WITH UNIFIED TRANSMISSION CONFIGURATION INDICATOR

(71) Applicant: QUALCOMM Incorporated, San Diego, CA (US)

(72) Inventors: Mostafa Khoshnevisan, San Diego, CA (US); Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/650,058

(22) Filed: Feb. 4, 2022

(65) Prior Publication Data
US 2023/0254870 A1    Aug. 10, 2023

(51) Int. Cl.
*H04W 72/02* (2009.01)
*H04L 5/00* (2006.01)
*H04L 27/26* (2006.01)
*H04W 16/28* (2009.01)
*H04W 72/044* (2023.01)
*H04W 72/1273* (2023.01)
*H04W 72/23* (2023.01)

(52) U.S. Cl.
CPC .............. *H04W 72/23* (2023.01); *H04L 5/001* (2013.01); *H04L 27/26025* (2021.01); *H04W 16/28* (2013.01); *H04W 72/046* (2013.01); *H04W 72/1273* (2013.01)

(58) Field of Classification Search
CPC . H04L 27/26025; H04L 5/001; H04L 5/0023; H04L 5/0044; H04L 5/0053; H04L 5/0055; H04L 5/0091; H04L 5/0094; H04W 16/28; H04W 72/046; H04W 72/1273; H04W 72/23; H04W 72/232
See application file for complete search history.

(56) References Cited

U.S. PATENT DOCUMENTS

| | | | |
|---|---|---|---|
| 2020/0029274 A1* | 1/2020 | Cheng | H04W 76/28 |
| 2020/0221485 A1* | 7/2020 | Cirik | H04L 25/0226 |
| 2020/0267712 A1* | 8/2020 | Cirik | H04W 72/23 |
| 2020/0351892 A1* | 11/2020 | Yi | H04L 5/0092 |

(Continued)

FOREIGN PATENT DOCUMENTS

| | | | | |
|---|---|---|---|---|
| CA | 3072491 A1 * | 8/2020 | ........... | H04L 5/0023 |
| CN | 117136606 A * | 11/2023 | .............. | H04L 1/08 |
| WO | WO-2023209984 A1 * | 11/2023 | | |

*Primary Examiner* — Phuc H Tran
(74) *Attorney, Agent, or Firm* — Harrity & Harrity, LLP

(57) ABSTRACT

Various aspects of the present disclosure generally relate to wireless communication. In some aspects, a user equipment (UE) may receive first downlink control information (DCI) that indicates a transmission configuration indicator (TCI) state to be applied starting from a starting time associated with the first DCI. The UE may receive, in a first component carrier, second DCI that schedules a downlink communication in a second component carrier. The UE may receive the downlink communication in the second component carrier using a default beam associated with the TCI state indicated by the first DCI in connection with a default beam condition associated with the second DCI. Numerous other aspects are described.

29 Claims, 12 Drawing Sheets

(56) References Cited

U.S. PATENT DOCUMENTS

| | | | |
|---|---|---|---|
| 2023/0254815 A1* | 8/2023 | Khoshnevisan | H04W 72/046 370/329 |
| 2024/0008044 A1* | 1/2024 | Bai | H04B 7/0695 |

* cited by examiner

DEFAULT BEAM FOR CROSS-CARRIER SCHEDULING WITH UNIFIED TRANSMISSION CONFIGURATION INDICATOR

FIELD OF THE DISCLOSURE

Aspects of the present disclosure generally relate to wireless communication and to techniques and apparatuses for a default beam for cross-carrier scheduling with a unified transmission configuration indicator (TCI).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to receive first downlink control information (DCI) that indicates a transmission configuration indicator (TCI) state to be applied starting from a starting time associated with the first DCI. The one or more processors may be configured to receive, in a first component carrier, second DCI that schedules a downlink communication in a second component carrier. The one or more processors may be configured to receive the downlink communication in the second component carrier using a default beam associated with the TCI state indicated by the first DCI in connection with a default beam condition associated with the second DCI.

Some aspects described herein relate to a network node for wireless communication. The network node may include a memory and one or more processors coupled to the memory. The one or more processors may be configured to transmit, to a UE, first DCI that indicates a TCI state to be applied starting from a starting time associated with the first DCI. The one or more processors may be configured to transmit, to the UE in a first component carrier, second DCI that schedules a downlink communication in a second component carrier. The one or more processors may be configured to transmit the downlink communication in the second component carrier using a default beam associated with the TCI state indicated by the first DCI in connection with a default beam condition associated with the second DCI.

Some aspects described herein relate to a method of wireless communication performed by a UE. The method may include receiving first DCI that indicates a TCI state to be applied starting from a starting time associated with the first DCI. The method may include receiving, in a first component carrier, second DCI that schedules a downlink communication in a second component carrier. The method may include receiving the downlink communication in the second component carrier using a default beam associated with the TCI state indicated by the first DCI in connection with a default beam condition associated with the second DCI.

Some aspects described herein relate to a method of wireless communication performed by a network node. The method may include transmitting, to a UE, first DCI that indicates a TCI state to be applied starting from a starting time associated with the first DCI. The method may include transmitting, to the UE in a first component carrier, second DCI that schedules a downlink communication in a second component carrier. The method may include transmitting the downlink communication in the second component carrier using a default beam associated with the TCI state indicated by the first DCI in connection with a default beam condition associated with the second DCI.

Some aspects described herein relate to a non-transitory computer-readable medium that stores a set of instructions for wireless communication by a UE. The set of instructions, when executed by one or more processors of the UE, may cause the UE to receive first DCI that indicates a TCI state to be applied starting from a starting time associated with the first DCI. The set of instructions, when executed by one or more processors of the UE, may cause the UE to receive, in a first component carrier, second DCI that schedules a downlink communication in a second component carrier. The set of instructions, when executed by one or more processors of the UE, may cause the UE to receive the downlink communication in the second component carrier using a default beam associated with the TCI state indicated by the first DCI in connection with a default beam condition associated with the second DCI.

Some aspects described herein relate to a non-transitory computer-readable medium that stores a set of instructions for wireless communication by a network node. The set of instructions, when executed by one or more processors of the network node, may cause the network node to transmit, to a UE, first DCI that indicates a TCI state to be applied starting from a starting time associated with the first DCI. The set of instructions, when executed by one or more processors of the network node, may cause the network node to transmit, to the UE in a first component carrier, second DCI that schedules a downlink communication in a second component carrier. The set of instructions, when executed by one or more processors of the network node, may cause the network node to transmit the downlink communication in the second component carrier using a default beam associated with the TCI state indicated by the first DCI in connection with a default beam condition associated with the second DCI.

Some aspects described herein relate to an apparatus for wireless communication. The apparatus may include means for receiving first DCI that indicates a TCI state to be applied starting from a starting time associated with the first DCI. The apparatus may include means for receiving, in a first component carrier, second DCI that schedules a downlink communication in a second component carrier. The apparatus may include means for receiving the downlink communication in the second component carrier using a default beam associated with the TCI state indicated by the first DCI in connection with a default beam condition associated with the second DCI.

Some aspects described herein relate to an apparatus for wireless communication. The apparatus may include means for transmitting, to a UE, first DCI that indicates a TCI state to be applied starting from a starting time associated with the first DCI. The apparatus may include means for transmitting, to the UE in a first component carrier, second DCI that schedules a downlink communication in a second component carrier. The apparatus may include means for transmitting the downlink communication in the second component carrier using a default beam associated with the TCI state indicated by the first DCI in connection with a default beam condition associated with the second DCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
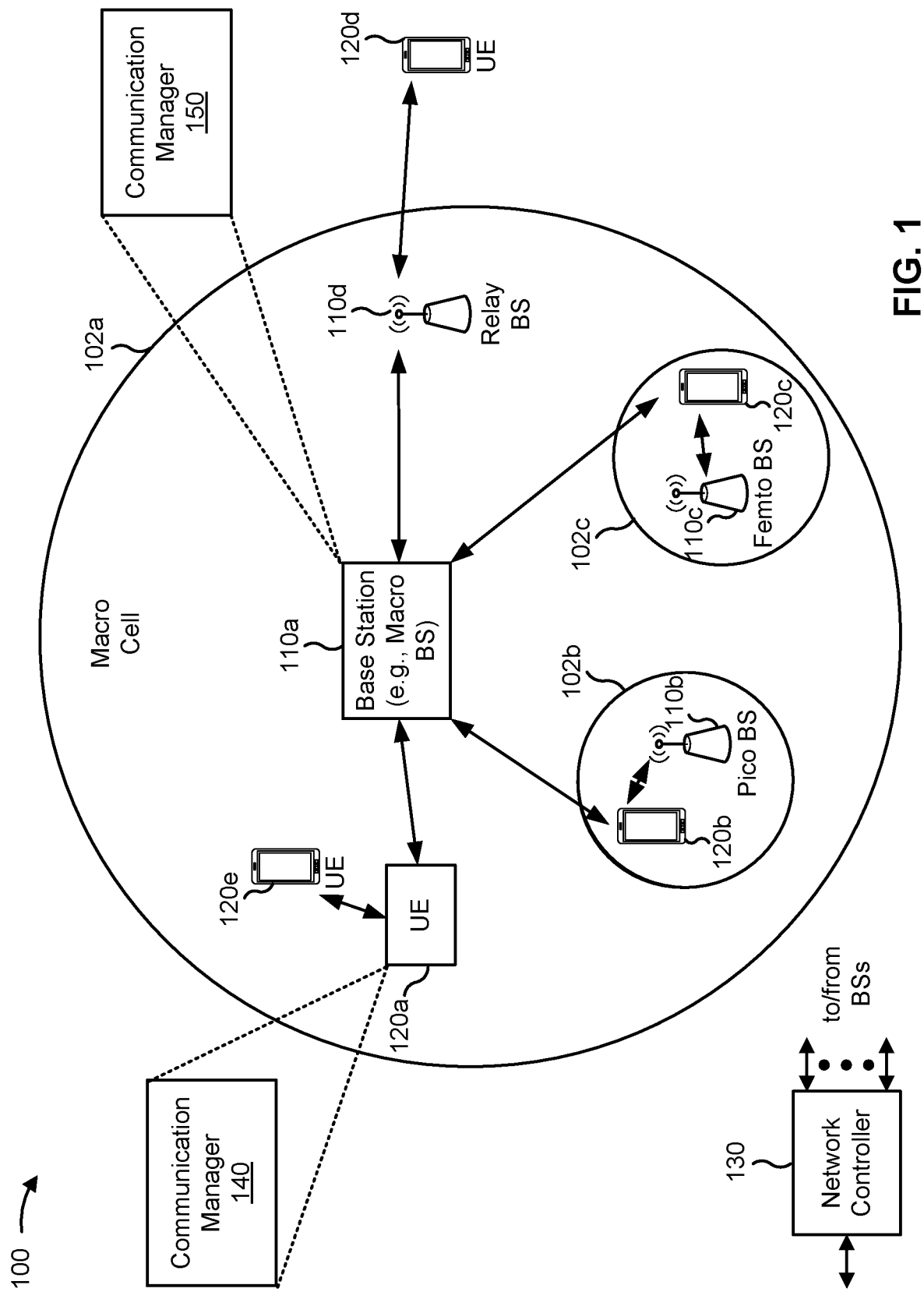
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive first downlink control information (DCI) that indicates a transmission configuration indicator (TCI) state to be applied starting from a starting time associated with the first DCI; receive, in a first component carrier, second DCI that schedules a downlink communication in a second component carrier; and receive the downlink communication in the second component carrier using a default beam associated with the TCI state indicated by the first DCI in connection with a default beam condition associated with the second DCI. Additionally, or alternatively, the communication manager 140 may perform one or more other operations described herein.

In some aspects, a network node (e.g., a base station 110 or one or more components described in connection with FIG. 3) may include a communication manager 150. As described in more detail elsewhere herein, the communication manager 150 may transmit, to a UE, first DCI that indicates a TCI state to be applied starting from a starting time associated with the first DCI; transmit, to the UE in a first component carrier, second DCI that schedules a downlink communication in a second component carrier; and transmit the downlink communication in the second component carrier using a default beam associated with the TCI state indicated by the first DCI in connection with a default beam condition associated with the second DCI. Additionally, or alternatively, the communication manager 150 may perform one or more other operations described herein.

As indicated above, FIG. 1 is provided as an example. Other examples may differ from what is described with regard to FIG. 1.

Figure 2:
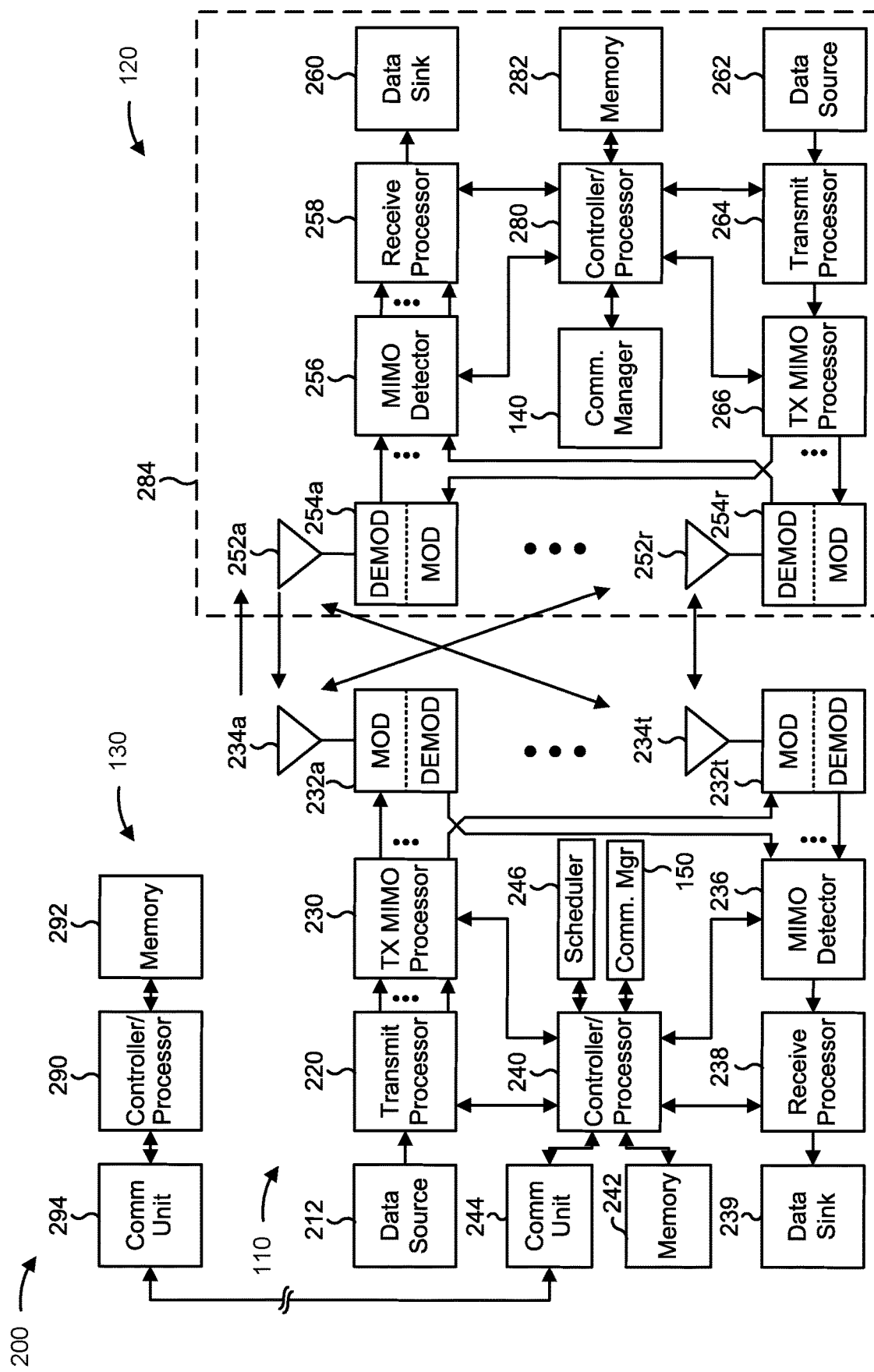
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, the controller/processor 280 of the UE 120, and/or any other component(s) of FIG. 2 may perform one or more techniques associated with a default beam for cross-carrier scheduling with a unified TCI, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples. In some aspects, a network node described herein is the base station 110, is included in the base station 110, or includes one or more components of the base station 110 shown in FIG. 2.

In some aspects, the UE 120 includes means for receiving first DCI that indicates a TCI state to be applied starting from a starting time associated with the first DCI; means for receiving, in a first component carrier, second DCI that schedules a downlink communication in a second component carrier; and/or means for receiving the downlink communication in the second component carrier using a default beam associated with the TCI state indicated by the first DCI in connection with a default beam condition associated with the second DCI. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting, to a UE, first DCI that indicates a TCI state to be applied starting from a starting time associated with the first DCI; means for transmitting, to the UE in a first component carrier, second DCI that schedules a downlink communication in a second component carrier; and/or means for transmitting the downlink communication in the second component carrier using a default beam associated with the TCI state indicated by the first DCI in connection with a default beam condition associated with the second DCI. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
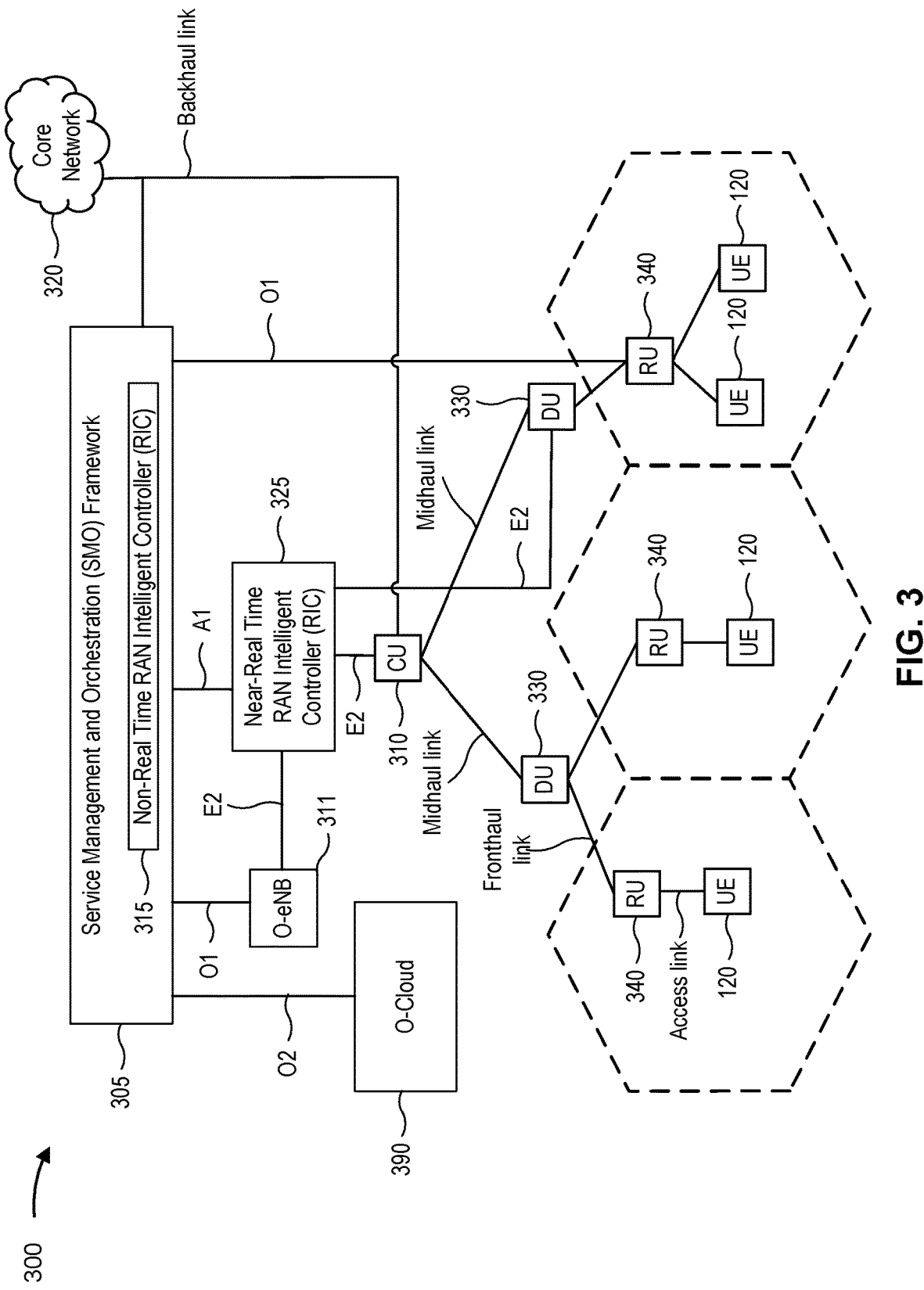
FIG. 3 is a diagram illustrating an example disaggregated base station architecture, in accordance with the present disclosure.

FIG. 3 is a diagram illustrating an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) MC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT MC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with respect to FIG. 3.

Figure 4:
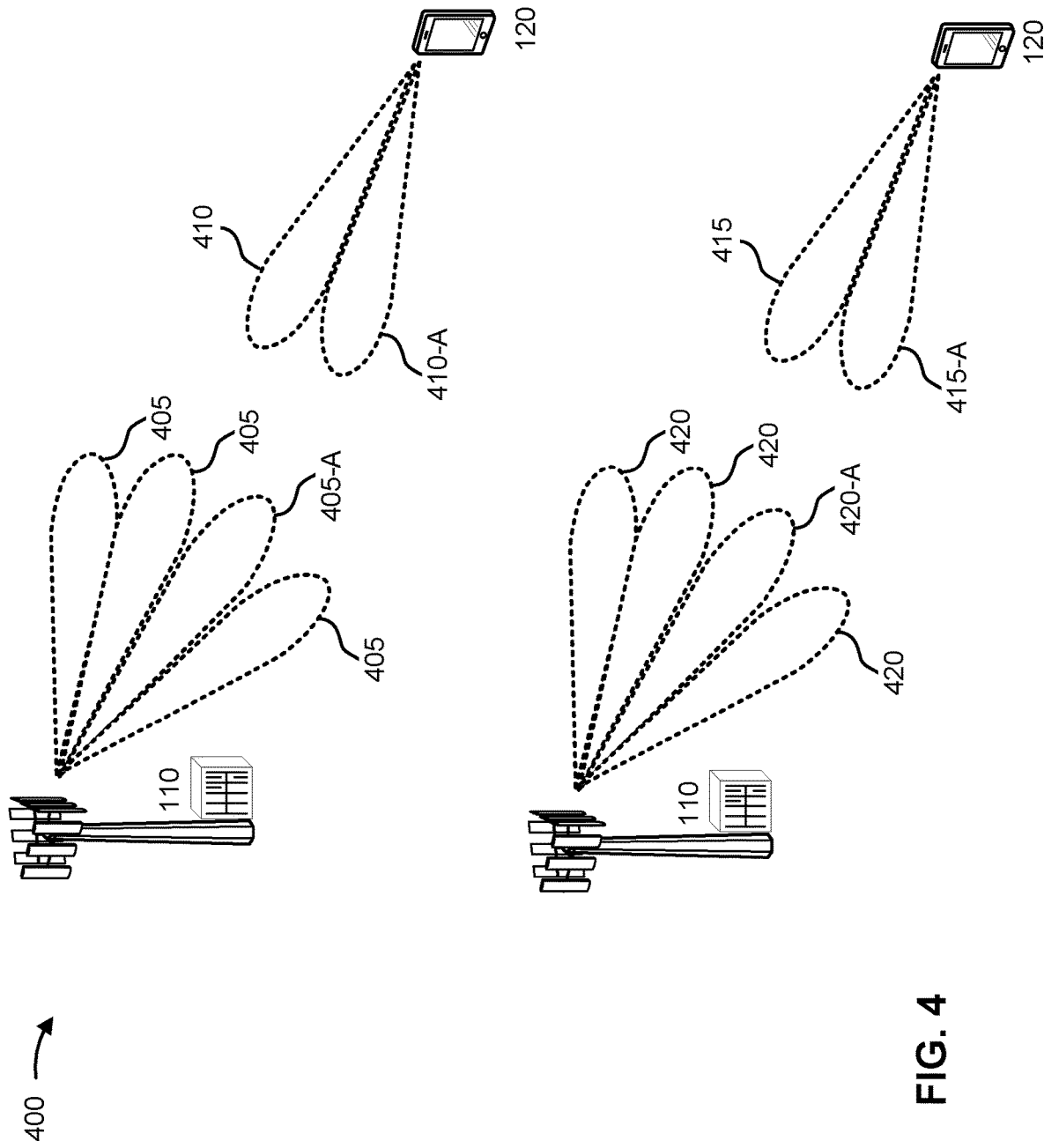
FIG. 4 is a diagram illustrating an example of using beams for communications between a base station and a UE, in accordance with the present disclosure.

FIG. 4 is a diagram illustrating an example 400 of using beams for communications between a base station and a UE, in accordance with the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit (Tx) beam, and the UE 120 may receive the transmission using a directional UE receive (Rx) beam. Each BS Tx beam may have an associated beam identifier (ID), beam direction, or beam symbols, among other examples. The base station 110 may transmit downlink communications via one or more BS Tx beams 405.

The UE 120 may attempt to receive downlink transmissions via one or more UE Rx beams 410, which may be configured using different beamforming parameters at Rx circuitry of the UE 120. The UE 120 may identify a particular BS Tx beam 405, shown as BS Tx beam 405-A, and a particular UE Rx beam 410, shown as UE Rx beam 410-A, that provide relatively favorable performance (for example, that have a best channel quality of the different measured combinations of BS Tx beams 405 and UE Rx beams 410). In some examples, the UE 120 may transmit an indication of which BS Tx beam 405 is identified by the UE 120 as a preferred BS Tx beam, which the base station 110 may select for transmissions to the UE 120. The UE 120 may thus attain and maintain a beam pair link (BPL) with the base station 110 for downlink communications (for example, a combination of the BS Tx beam 405-A and the UE Rx beam 410-A), which may be further refined and maintained in accordance with one or more established beam refinement procedures.

A downlink beam, such as a BS Tx beam 405 or a UE Rx beam 410, may be associated with a TCI state. A TCI state may indicate a directionality or a characteristic of the downlink beam, such as one or more quasi co-location (QCL) properties of the downlink beam. A QCL property may include, for example, a Doppler shift, a Doppler spread, an average delay, a delay spread, or spatial receive parameters, among other examples. In some examples, each BS Tx beam 405 may be associated with a synchronization signal block (SSB), and the UE 120 may indicate a preferred BS Tx beam 405 by transmitting uplink transmissions in resources of the SSB that are associated with the preferred BS Tx beam 405. A particular SSB may have an associated TCI state (for example, for an antenna port or for beamforming). The base station 110 may, in some examples, indicate a downlink BS Tx beam 405 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE Rx beam 410 at the UE 120. Thus, the UE 120 may select a corresponding UE Rx beam 410 from a set of BPLs based at least in part on the base station 110 indicating a BS Tx beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, a number (e.g., up to 128) TCI states may be configured for the UE 120 by a configuration message, such as an RRC message, that is transmitted from the base station 110 to the UE 120. In some examples, the base station 110 may transmit, to the UE 120, a MAC control element (MAC-CE) that activates a number (e.g., up to 8) of the configured TCI states for PDSCH. For example, the MAC-CE may indicate a set of activated TCI states for PDSCH for the UE 120. The activated TCI states may be mapped to respective TCI codepoints in DCI. In some examples, DCI that schedules a PDSCH communication (e.g., DCI format 1_1 and/or DCI format 1_2) may indicate an activated TCI state, from the set of activated TCI states, via a TCI field included in the DCI. For example, the TCI field of the DCI may include an indication of a TCI codepoint that maps to an activated TCI state to be used by the UE 120 to receive the scheduled PDSCH communication. In some examples, the indication of the activated TCI in the DCI that schedules a PDSCH communication may not be applicable to PDSCH communications other than the PDSCH communication scheduled by that DCI. In some cases, the TCI field may not be present in scheduling DCI for a PDSCH communication (e.g., based at least in part on RRC configurations tci-PresentinDCI and/or tci-PresentinDCI-1-2, which are included as part of a CORESET configuration). In some examples, if the TCI field is not present in scheduling DCI for a PDSCH communication, the TCI state for the scheduled PDSCH communication follows the TCI state of the scheduling CORESET (e.g., the CORESET in which the scheduling DCI is detected by the UE 120).

For uplink communications, the UE 120 may transmit in the direction of the base station 110 using a directional UE Tx beam, and the base station 110 may receive the transmission using a directional BS Rx beam. Each UE Tx beam may have an associated beam ID, beam direction, or beam symbols, among other examples. The UE 120 may transmit uplink communications via one or more UE transmit beams 415.

The base station 110 may receive uplink transmissions via one or more BS Rx beams 420. The base station 110 may identify a particular UE Tx beam 415, shown as UE Tx beam 415-A, and a particular BS Rx beam 420, shown as BS Rx beam 420-A, that provide relatively favorable performance (for example, that have a best channel quality of the different measured combinations of UE Tx beams 415 and BS Rx beams 420). In some examples, the base station 110 may transmit an indication of which UE Tx beam 415 is identified by the base station 110 as a preferred UE Tx beam, which the base station 110 may select for transmissions from the UE 120. The UE 120 and the base station 110 may thus attain and maintain a BPL for uplink communications (for example, a combination of the UE Tx beam 415-A and the BS Rx beam 420-A), which may be further refined and maintained in accordance with one or more established beam refinement procedures. In some examples, an uplink beam, such as a UE Tx beam 415 or a BS Rx beam 420, may be associated with a spatial relation. A spatial relation may indicate a directionality or a characteristic of the uplink beam, similar to one or more QCL properties, as described above.

As indicated above, FIG. 4 is provided as an example. Other examples may differ from what is described with respect to FIG. 4.

Figure 5:
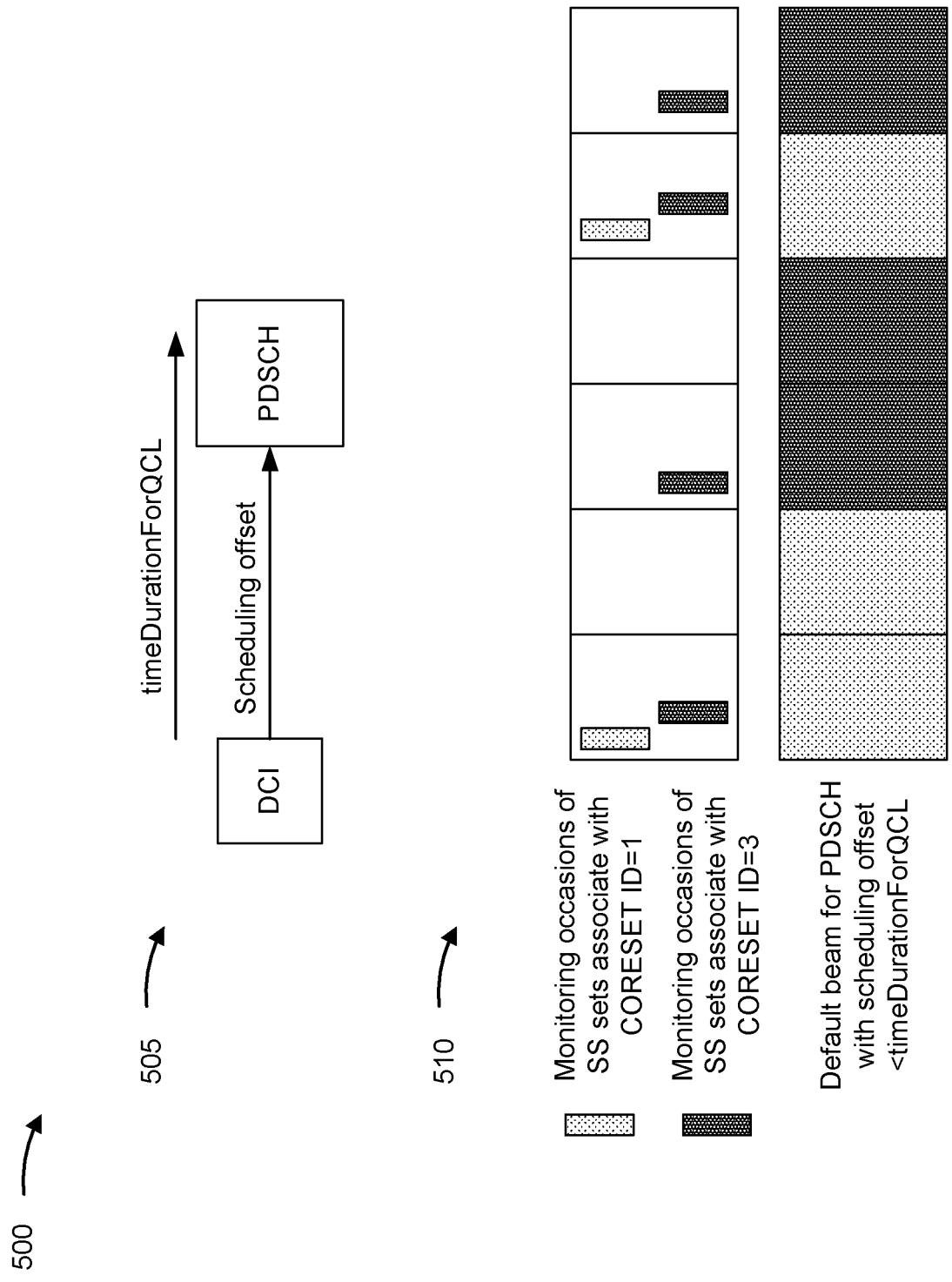
FIG. 5 is a diagram illustrating an example of using a default beam for a downlink communication, in accordance with the present disclosure.

FIG. 5 is a diagram illustrating an example 500 of using a default beam for a downlink communication, in accordance with the present disclosure, in accordance with the present disclosure.

As shown in FIG. 5, and by reference number 505, a UE (e.g., UE 120) may receive DCI that schedules a PDSCH communication. The PDSCH communication may be scheduled to be transmitted to the UE at a scheduling offset with respect to the DCI that schedules the PDSCH communication. "Scheduling offset" refers to a time offset between the DCI and the PDSCH communication scheduled by the DCI.

The DCI may include an indication of a TCI state that identifies the downlink beam (e.g., the UE Rx beam) for the PDSCH communication. The TCI state may indicate a QCL property of a downlink beam in accordance with a QCL type. In some cases (e.g., for communications in FR2), the QCL type may be QCL-TypeD, which indicates spatial receive parameters for the downlink beam. In some examples, in a case in which QCL-TypeD is used (e.g., in FR2), the indicated TCI state in the scheduling DCI for a PDSCH communication may only be applied for the PDSCH communication if the scheduling offset between the scheduling DCI and the scheduled PDSCH communication is equal to or larger than a time duration for QCL (e.g., timeDurationForQCL). The time duration for QCL (e.g., timeDurationForQCL) may be a time duration indicated in or configured based at least in part on UE capability information for the UE. For example, the time duration for QCL (e.g., timeDurationForQCL) may be a time duration in which the UE is capable of decoding DCI and changing an Rx beam of the UE in accordance with an indicated TCI state in the DCI.

As shown in FIG. 5, in some cases, the scheduling offset for a scheduled PDSCH communication may be less than the time duration for QCL (e.g., timeDurationForQCL). If the scheduling offset is less than the time duration for QCL (e.g., timeDurationForQCL), a default beam may be used for the PDSCH communication, as there may not be enough time for the UE to decode the DCI and apply an Rx beam corresponding to the TCI state indicated in the DCI. The default beam may be a beam associated with a default QCL assumption (e.g., for QCL-TypeD) for PDSCH.

As shown in FIG. 5, and by reference number 510, the UE may be configured with periodic monitoring occasions for search space (SS) sets associated with different CORESETs. For example, the UE may be configured with monitoring occasions for search space sets associated with a first CORESET with a CORESET ID of 1 and monitoring occasions of SS sets associated with a second CORESET with a CORESET ID of 3. In some examples, in a case in which the scheduling offset between a scheduling DCI and a scheduled PDSCH communication is less than the time duration for QCL (e.g., timeDurationForQCL), the default QCL assumption that identifies the default beam for the PDSCH communication may be a QCL/TCI state associated with a CORESET having a lowest CORESET ID among CORESETs with monitored SS sets in a latest slot in which one or more CORESETs within an active bandwidth part (BWP) of a serving cell are monitored by the UE. That is, the default beam for a PDSCH communication with a scheduling offset that is less than the time duration for QCL may be the beam associated with a monitored CORESET having the lowest CORESET ID in the latest slot (with respect to the slot in which the PDSCH communication is scheduled) in which one or more CORESETs are monitored by the UE. As shown in FIG. 5, if the PDSCH communication is scheduled in a slot in which the first CORESET (e.g., CORESET ID=1) and the second CORESET are both monitored by the UE, the default beam used for the PDSCH communication is a beam associated with the first CORESET, which has a lower CORESET ID than the second CORESET. If the PDSCH communication is scheduled in a slot in which only the second CORESET is monitored by the UE, the default beam for the PDSCH communication is the beam associated with the second CORESET. If the PDSCH communication is scheduled in a slot in which no CORESET is monitored by the UE, the default beam for the PDSCH communication is the beam associated with the monitored CORESET with the lowest CORESET ID in a latest slot, prior to the slot in which the PDSCH communication is scheduled, in which one or more CORESETs are monitored by the UE.

"Cross-carrier" scheduling refers to DCI carried in one component carrier (CC) scheduling one or more communications on another CC. For example, cross-carrier scheduling may be used to schedule PDSCH communications, physical uplink shared channel (PUSCH) communications, and/or reference signal transmissions (e.g., for downlink and/or uplink reference signals). The CC in which the DCI is carrier may be referred to as the "scheduling CC," and the CC in which a communication is scheduled may be referred to as the "scheduled CC." In some cases, a scheduling CC may be used to carry DCI that schedules communications on multiple different scheduled CCs. With cross-carrier scheduling for PDSCH communications, the scheduling DCI/CORESET and the scheduled PDSCH are in different CCs, and the scheduled CC may not be configured with any CORESET, as the UE may not monitor for PDCCH on the scheduled CC. In this case, the default beam for a PDSCH scheduled in the scheduled CC cannot be determined from latest monitored CORESETs in the scheduled CC.

In some examples, for a PDSCH scheduling with cross-carrier scheduling, the default beam for a PDSCH communication (both in cases in which the TCI field is not present in the scheduling DCI and in cases in which the scheduling offset is less than the time duration for QCL), may be a beam corresponding to the activated TCI state with the lowest TCI state ID (e.g., among the set of TCI states activated by a MAC-CE). That is the UE may obtain the QCL assumption for the default beam for a scheduled PDSCH communication from the activated TCI state with the lowest TCI state ID applicable to the PDSCH communication in the active BWP of the scheduled CC. In some examples, if the subcarrier spacing of the scheduling CC is different from the subcarrier spacing of the scheduled CC, an additional delay may be added to the time duration for QCL (e.g., timeDurationForQCL). For example, if a numerology ($\mu_{PDCCH}$) of the scheduling CC is less than a numerology ($\mu_{PDSCH}$) of the scheduled CC, an additional timing delay of $$d \frac{2^{\mu_{PDSCH}}}{2^{\mu_{PDCCH}}}$$

may be added to timeDurationForQCL, where d is specified in a wireless communication standard (e.g., a 3GPP standard).

As indicated above, FIG. 5 is provided as an example. Other examples may differ from what is described with respect to FIG. 5.

Figure 6:
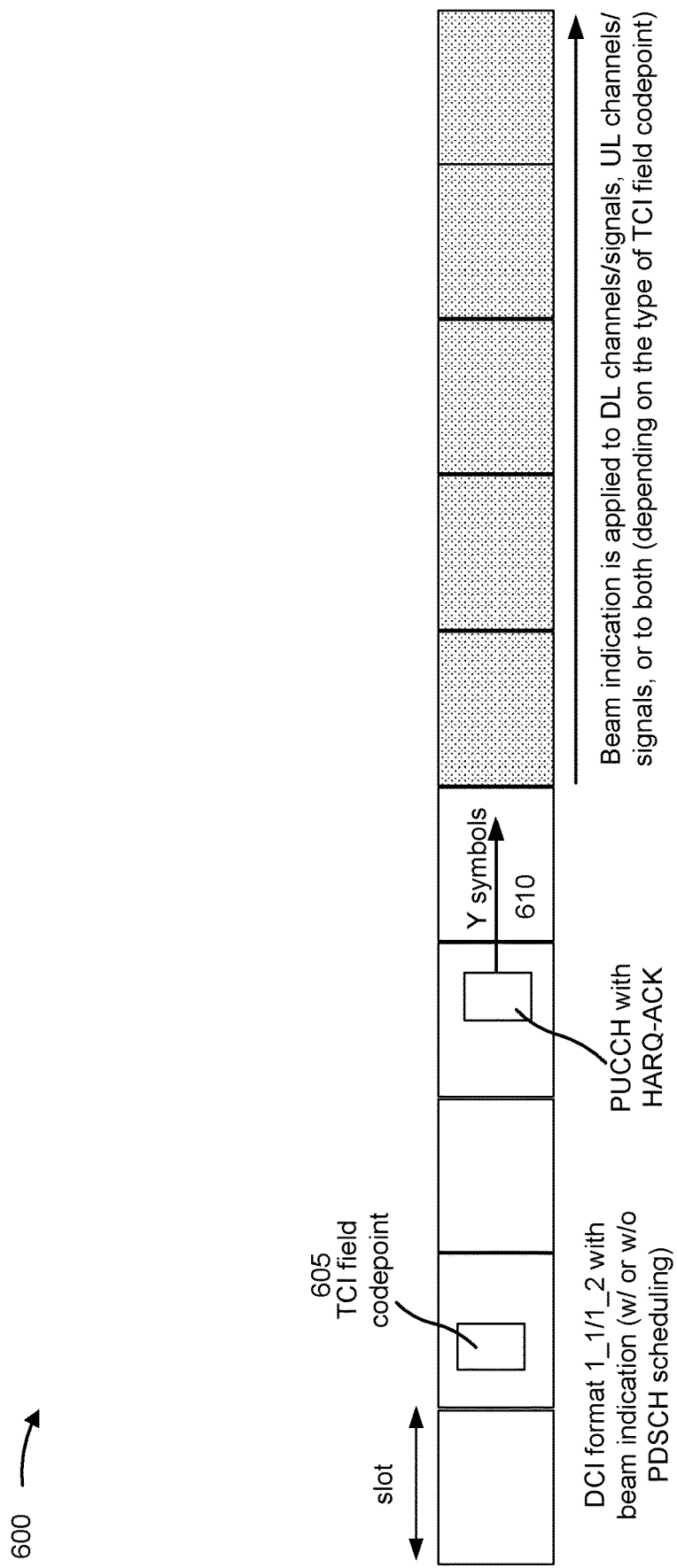
FIG. 6 is a diagram illustrating an example of using a unified transmission configuration indicator (TCI) beam indication, in accordance with the present disclosure.

FIG. 6 is a diagram illustrating an example 600 of using a unified TCI beam indication, in accordance with the present disclosure.

As described above in connection with FIG. 4, in some examples, a TCI state may be used for a downlink beam indication and a spatial relation may be used for an uplink beam indication. Such beam indications may be referred to herein as "non-unified beam indications." Non-unified beam indications may be applied to one channel for one communication scheduled in that channel.

In some examples, a base station (e.g., base station 110) and a UE (e.g., UE 120) may use a unified TCI framework for both downlink and uplink beam indications. In the unified TCI framework, TCI state indications may be used to indicate a joint downlink and uplink TCI state or to indicate separate downlink and uplink TCI states. Such a TCI state indication that may be used to indicate a joint downlink and uplink beam, a separate downlink beam, or a separate uplink beam is referred to herein as a "unified TCI state indication." A unified TCI state indication (e.g., a joint downlink and uplink TCI state indication and/or separate downlink and uplink TCI state indications) may be applied to multiple channels. For example, the unified TCI state indication of a joint uplink and downlink TCI state may be used to indicate a beam direction for one or more downlink channels (e.g., PDSCH and/or PDCCH) or reference signals (e.g., CSI-RS) and for one or more uplink channels (e.g., PUSCH and/or physical uplink control channel (PUCCH)) or reference signals (e.g., a sounding reference signal (SRS)). The unified TCI state indication of a separate downlink TCI state may be used to indicate a beam direction for multiple downlink channels (e.g., PDSCH and PDCCH) or reference signals (e.g., CSI-RS). The unified TCI state indication of a separate uplink TCI state may be used to indicate a beam direction to be used for multiple uplink channels (e.g., PUSCH and PUCCH) or reference signals (e.g., SRS). In some examples, the unified TCI state indication may be "sticky," such that the indicated beam direction will be used for the channels and/or reference signals to which the TCI state indication applies until a further indication is received.

In some examples, there may be two TCI state indication modes in the unified TCI state framework. A first mode may be a separate downlink and uplink TCI state indication mode, in which separate downlink and uplink TCI states are used to indicate downlink and uplink beam directions for the UE. For example, the separate downlink and uplink TCI state indication mode may be used when the UE is having maximum permissible exposure (MPE) issues to indicate different beam directions, for the UE, for an uplink beam (e.g., a UE Tx beam) and a downlink beam (e.g., a UE Rx beam). A second mode may be a joint downlink and uplink TCI state indication mode, in which a TCI state indication is used to indicate, to the UE, a joint uplink and downlink beam direction. For example, the joint downlink and uplink TCI state indication mode may be used when the UE has channel correspondence between downlink and uplink channels (which may be assumed in some examples), and the same beam direction can be used for an uplink beam (e.g., a UE Tx beam) and a downlink beam (e.g., a UE Rx beam).

In some examples, in the unified TCI state framework, downlink TCI states, uplink TCI states, and/or joint downlink and uplink TCI states may be configured for a UE via RRC signaling from a base station. A MAC-CE, transmitted from the base station to the UE, may activate a number of the RRC-configured TCI states and indicate a mapping of TCI field codepoints. In some examples, one TCI field codepoint may represent a joint downlink and uplink TCI state, and the TCI field codepoint may be used for a joint downlink and uplink beam indication. In some examples, one TCI field may represent a pair of TCI states including a downlink TCI state and an uplink TCI state, and the TCI field codepoint may be used for a separate downlink and uplink beam indication. In some examples, one TCI field codepoint may represent only a downlink TCI state, and the TCI field codepoint may be used for a downlink only beam indication. In some examples, one TCI field codepoint may represent only an uplink TCI state, and the TCI field codepoint may be used for an uplink only beam indication. If the MAC-CE indicates a mapping to only a single TCI field codepoint, the MAC-CE may serve as the beam indication. In this case, the UE may begin applying the beam indication indicated in the MAC-CE a certain time duration (e.g., 3 ms) after a hybrid automatic repeat request acknowledgement (HARQ-ACK) transmitted to the base station in response to the PDSCH communication carrying the MAC-CE.

If the MAC-CE indicates a mapping to more than one TCI field codepoint, DCI including an indication of a TCI field codepoint may be used to provide a beam indication to the UE. As shown in FIG. 6, and by reference number 605, the UE may receive (e.g., via a PDCCH communication) DCI that includes an indication of a TCI field codepoint. The TCI field codepoint may map to a unified TCI state indication, which may correspond to a joint downlink and uplink TCI state, a separate downlink and uplink TCI state pair, a downlink only TCI state, or an uplink only TCI state. In some aspects, DL DCI (e.g., DCI format 1_1/1_2), with or without a downlink assignment, may be used to provide the beam indication (e.g., the indication of the TCI field codepoint). The DCI that includes the indication of the TCI field codepoint may be referred to a "beam indication DCI."

As further shown in FIG. 6, the UE may transmit, to the base station, a PUCCH communication that includes a HARQ-ACK in response to the DCI including the TCI field codepoint (e.g., the beam indication DCI). As shown by reference number 610, the UE may apply the beam indication starting in a first slot that is at least Y symbols after a last symbol of the PUCCH communication carrying the HARQ-ACK feedback transmitted in response to the beam indication DCI. For example, Y may be configured for the UE (e.g., via RRC signaling) based at least in part on UE capability. The beam indication may be applied to downlink channels and reference signals (e.g., PDSCH, PDCCH, and CSI-RS), uplink channels and reference signals (e.g., PUSCH, PUCCH, and SRS), or both downlink and uplink channels and reference signals, depending on the type of TCI field codepoint. The beam indication (e.g., the unified TCI state indication) may be "sticky." That is, the beam indication is not specific to a scheduled PDSCH communication, but instead once the UE starts applying the beam indication, the UE may continue to use indicated beam for the applicable channels and reference signals until the UE receives another beam indication DCI (e.g., another DCI format 1_1/1_2 including a TCI field codepoint) that changes the beam.

When receiving the DCI-based beam indication in the unified TCI framework, the UE may start applying a beam associated with a TCI state, from the set of activated TCI states, to downlink channels and reference signals (and/or uplink channels and reference signals), and continue applying the same beam until another beam indication DCI is received. In this case, the beam indicated by the beam indication DCI (e.g., DCI format 1_1/1_2 with or without a downlink assignment) may not be the activated TCI state with the lowest TCI state ID (e.g., the lowest TCI field codepoint value). However, when cross-carrier scheduling is used to schedule a PDSCH communication, the default PDSCH beam (for cases in which the TCI field is not included in the scheduling DCI or the scheduling offset is less than the time duration for QCL (timeDurationforQCL)) may be the beam associated with the lowest TCI state ID. Accordingly, in cases in which the beam indication DCI indicates a TCI state other than the TCI state with the lowest TCI state ID among the activated TCI states, the default PDSCH beam is different from the beam that is being applied to downlink channels and reference signals. As a result, the UE may unnecessarily switch from the indicated beam for downlink communications to a different default beam in order to receive a scheduled PDSCH communication in cases in which the TCI field is not included in the scheduling DCI or the scheduling offset is less than the time duration for QCL. This may increase power consumption by the UE, and may decrease reliability of the PDSCH communication due to the UE using a default beam that is less reliable than the beam indicated in the beam indication DCI to receive the PDSCH communication.

Some techniques and apparatuses described herein enable, a UE to receive DCI that indicates a TCI state to be applied starting from a starting time associated with the first DCI. The UE may receive, in a first CC, second DCI that schedules a downlink communication (e.g., a PDSCH communication) in a second CC. The UE may receive the downlink communication in the second CC using a default beam associated with the first TCI indicated by the first DCI in connection with a default beam condition associated the second DCI. For example, the default beam condition may be detected when a scheduling offset between the second DCI and the downlink communication is less than a time duration threshold or when a TCI field is absent from the second DCI. As a result, the UE may use the beam associated with the TCI state indicated by the first DCI as the default beam for receiving a scheduled downlink communication, even when the TCI state indicated in the first DCI is not the TCI state with the lowest TCI state ID among a set of activated TCI states. Thus, the UE may avoid unnecessarily switching between the indicated beam in the first DCI to a different default beam when receiving scheduled downlink communications, which may reduce power consumption by the UE and increase reliability of downlink communications to the UE.

As indicated above, FIG. 6 is provided as an example. Other examples may differ from what is described with respect to FIG. 6.

Figure 7:
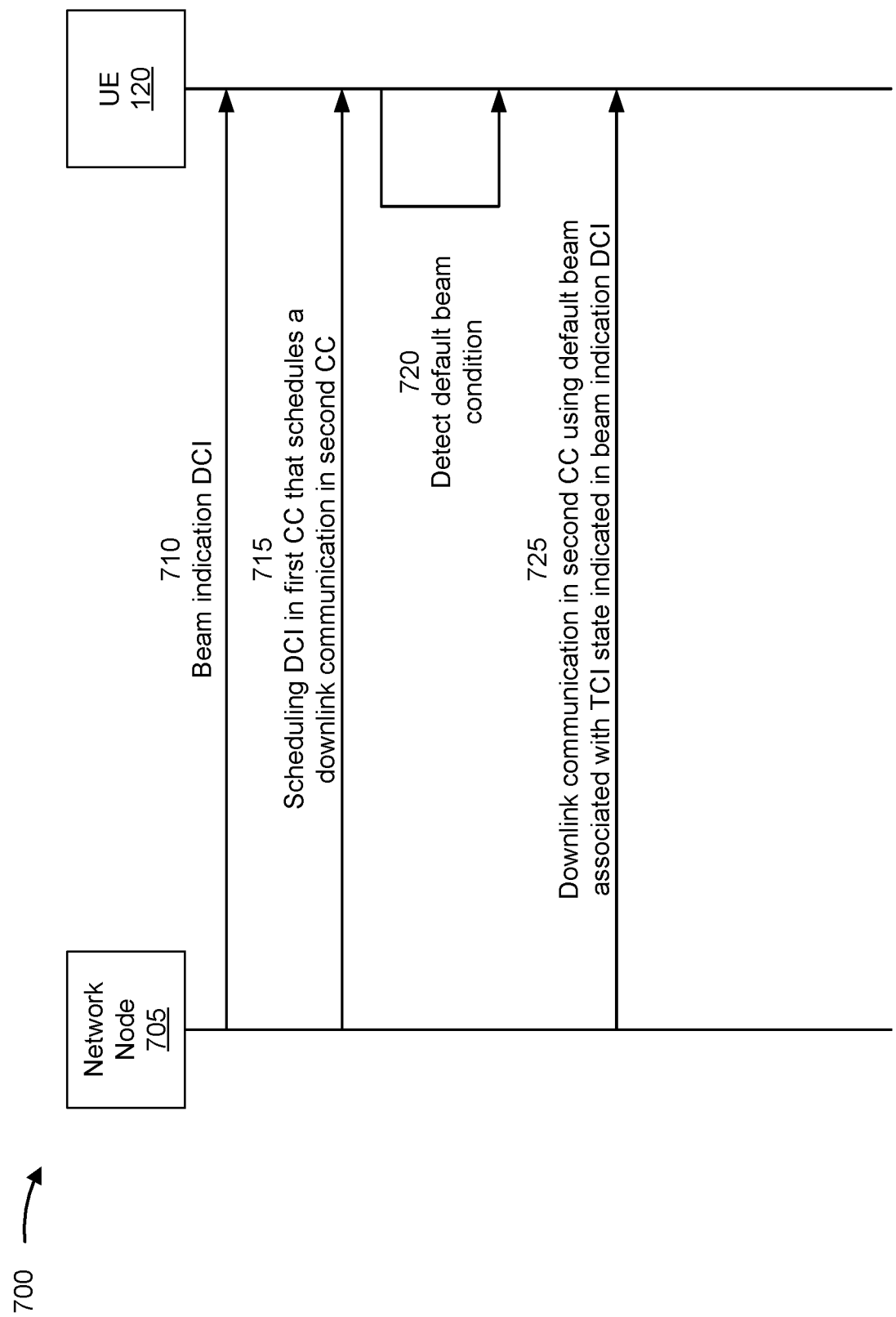
FIGS. 7-8 are diagrams illustrating examples associated with a default beam for cross-carrier scheduling with a unified TCI, in accordance with the present disclosure.

FIG. 7 is a diagram illustrating an example 700 associated with a default beam for cross-carrier scheduling with a unified TCI, in accordance with the present disclosure. As shown in FIG. 7, example 700 includes communication between a network node 705 (e.g., base station 110, CU 310, DU 330, RU 340, or a combination thereof) and a UE 120. In some aspects, the network node 705 and the UE 120 may be included in a wireless network, such as wireless network 100. The network node 705 and the UE 120 may communicate via a wireless access link, which may include an uplink and a downlink.

As shown in FIG. 7, and by reference number 710, the network node 705 may transmit, to the UE 120, beam indication DCI (e.g., "first DCI"). The UE 120 may receive the beam indication DCI. In some aspects, the network node 705 may transmit the beam indication DCI to the UE 120 in a first CC. For example, the first CC may be a scheduling CC, and the UE 120 may receive a PDCCH communication that includes the beam indication DCI in a CORESET monitored by the UE 120 in the first CC. The beam indication DCI may indicate a unified TCI state to be applied in a second CC that is configured with unified TCI. The beam indication DCI may be DCI format 1_1 or 1_2 transmitted with or without scheduling information for a downlink communication (e.g., a PDSCH communication). The beam indication DCI may indicate a TCI state (e.g., a unified TCI state) to be applied (in the second CC) starting from a starting time associated with the beam indication DCI. In some aspects, the starting time associated with the DCI may be a first slot at least Y symbols after a last symbol of a PUCCH communication including HARQ-ACK feedback associated with the beam indication DCI. For example, the number of symbols Y used to determine the starting time may be configured for the UE 120 via RRC signaling from the network node 705. In some aspects, the TCI state indicated by the beam indication DCI may be "sticky," and may be applied for downlink channels (e.g., PDSCH and PDCCH) and downlink reference signals (e.g., CSI-RS) (or for downlink and uplink channels and reference signals) in the second CC until another beam indication DCI is transmitted to the UE 120 by the network node 705.

The beam indication DCI may include an indication, in a TCI field of the DCI, of a TCI field codepoint that indicates a unified TCI state (e.g., a downlink TCI state or a joint downlink and uplink TCI state) to be applied starting from the starting time in the second CC. The TCI field codepoint may map to an activated TCI state from a set of activated TCI states indicated in a MAC-CE transmitted from the network node 705 to the UE 120. For example, the TCI field codepoint may map to a joint downlink and uplink TCI state, a pair of TCI states including separate downlink and uplink TCI states, or a downlink only TCI state. The MAC-CE may also indicate a mapping of the set of activated TCI states to corresponding TCI field codepoints.

As further shown in FIG. 7, and by reference number 715, the network node 705 may transmit, to the UE 120 in the first CC, scheduling DCI (e.g., "second DCI") that schedules a downlink communication in the second CC. The UE 120 may receive the scheduling DCI in the first CC. For example, the scheduling DCI may schedule a PDSCH communication for the UE 120 in the second CC. The first CC may be a scheduling CC for cross-carrier scheduling, and the second CC may be a scheduled CC for the downlink communication (e.g., PDSCH communication) scheduled by the scheduling DCI. In some aspects, the scheduling DCI may schedule the downlink communication in the second CC at or after the starting time associated the beam indication DCI (e.g., the starting time at which the TCI state indicated by the beam indication DCI is to be applied).

As further shown in FIG. 7, and by reference number 720, the UE 120 may detect a default beam condition associated with the scheduling DCI. The default beam condition associated with the scheduling DCI may be a condition that triggers the use of a default beam for receiving the scheduled downlink communication (e.g., PDSCH communication) by the UE 120.

In some aspects, the UE 120 may detect the default beam condition in connection with a determination that a scheduling offset between the scheduling DCI and the scheduled downlink communication (e.g., PDSCH communication) is less than a time duration threshold. The time duration threshold may be based at least in part on a time duration for QCL (e.g., timeDurationforQCL). The time duration for QCL (e.g., timeDurationForQCL) may be a time duration indicated in or configured based at least in part on UE capability information for the UE 120. In some aspects, the time duration threshold may be equal to the time duration for QCL (e.g., timeDurationForQCL). For example, when QCL-TypeD is used (e.g., in FR2), the UE 120 may detect the default beam condition in connection with a determination that the scheduling offset between the scheduling DCI and the scheduled downlink communication (e.g., PDSCH communication) is less than the time duration for QCL (e.g., timeDurationForQCL). In some aspects, in a case in which a first subcarrier spacing of the first CC is different from a second subcarrier spacing of the second CC, the time duration threshold may be equal to a sum of the time duration for QCL (e.g., timeDurationForQCL) and a delay associated the first subcarrier spacing and the second subcarrier spacing being different. For example, in a case in which a numerology ($\mu_{PDCCH}$) of the first CC is less than a numerology ($\mu_{PDSCH}$) of the second CC, the time duration threshold may be equal to a sum of timeDurationForQCL and a delay of $$d \frac{2^{\mu_{PDSCH}}}{2^{\mu_{PDCCH}}},$$

where d may be specified in a wireless communication standard (e.g., a 3GPP standard) or configured via RRC configuration.

In some aspects, the UE 120 may detect the default beam condition in connection with a determination that a TCI field is absent from the second DCI.

As further shown in FIG. 7, and by reference number 725, the UE 120 may receive the scheduled downlink communication in the second CC using a default beam associated with the TCI state indicated in the beam indication DCI. The UE 120, in connection with detecting the default beam condition associated with the scheduling DCI, may determine the default beam (e.g., UE Rx beam) to use to receive the downlink communication (e.g., PDSCH communication) scheduled in the second CC by the scheduling DCI. In some aspects, in a case in which the UE 120 detects the default beam condition associated with scheduling DCI, the default beam for receiving the scheduled downlink communication (e.g., PDSCH communication) in the second CC may a beam associated with the TCI state indicated in the latest beam indication DCI. The latest beam indication DCI may refer to the latest beam indication DCI for which the starting time for applying the indicated TCI state (e.g., for downlink communications or for downlink and uplink communications in the second CC) is before the scheduled downlink communication or in the same slot as the scheduled downlink communication.

For example, in a case in which the scheduling offset between the scheduling DCI in the first CC and the scheduled downlink communication (e.g., PDSCH communication) in the second CC is less than the time duration threshold, the default beam for the downlink communication (e.g., the default PDSCH beam) may be a beam corresponding to the TCI state indicated in the latest beam indication DCI. Additionally, or alternatively, in a case in which the TCI field is absent in the scheduling DCI, the default beam for the scheduled downlink communication (e.g., the default PDSCH beam) may be the beam corresponding to the TCI state indicated in the latest beam indication DCI.

The network node 705, in connection with transmitting the scheduling DCI in the first CC, may also detect the default beam condition associated with the scheduling DCI. For example, the network node 705 may detect the default beam condition associated with the scheduling DCI when either the scheduling offset between the scheduling DCI and the scheduled downlink communication (e.g., PDSCH communication) is less than the time duration or the TCI field is absent in the scheduling DCI. The network node 705, in connection with detecting the default beam condition associated with the scheduling DCI transmitted in the first CC, may transmit the scheduled downlink communication (e.g., PDSCH communication) to the UE 120 using a default beam (e.g., a default Tx beam) associated with the TCI state indication (e.g., the unified TCI state indication for downlink communications or for downlink and uplink communications in the second CC) in the latest beam indication DCI.

In some cases, the TCI state indicated for the second CC in the beam indication DCI (e.g., the latest beam indication DCI) may be a TCI state other than a TCI state associated with a lowest TCI state ID (e.g., TCI field codepoint value) in the set of activated TCI states for the UE 120 (e.g., the set of active TCI states indicated in the MAC-CE). In this case, the UE 120 may use the beam corresponding to the indicated TCI state in the beam indication DCI (e.g., the latest beam indication DCI) as the default beam even in cases in which the indicated TCI state is not the TCI state associated with the lowest TCI state ID in the set of activated TCI states. In this way, the UE 120 may avoid unnecessarily switching between the beam corresponding to the indicated TCI state in the beam indication DCI to a different default beam when receiving scheduled downlink (e.g., PDSCH) communications, which may reduce power consumption by the UE 120 and increase reliability of downlink (e.g., PDSCH) communications transmitted from the network node 705 to the UE 120.

As indicated above, FIG. 7 is provided as an example. Other examples may differ from what is described with respect to FIG. 7.

Figure 8:
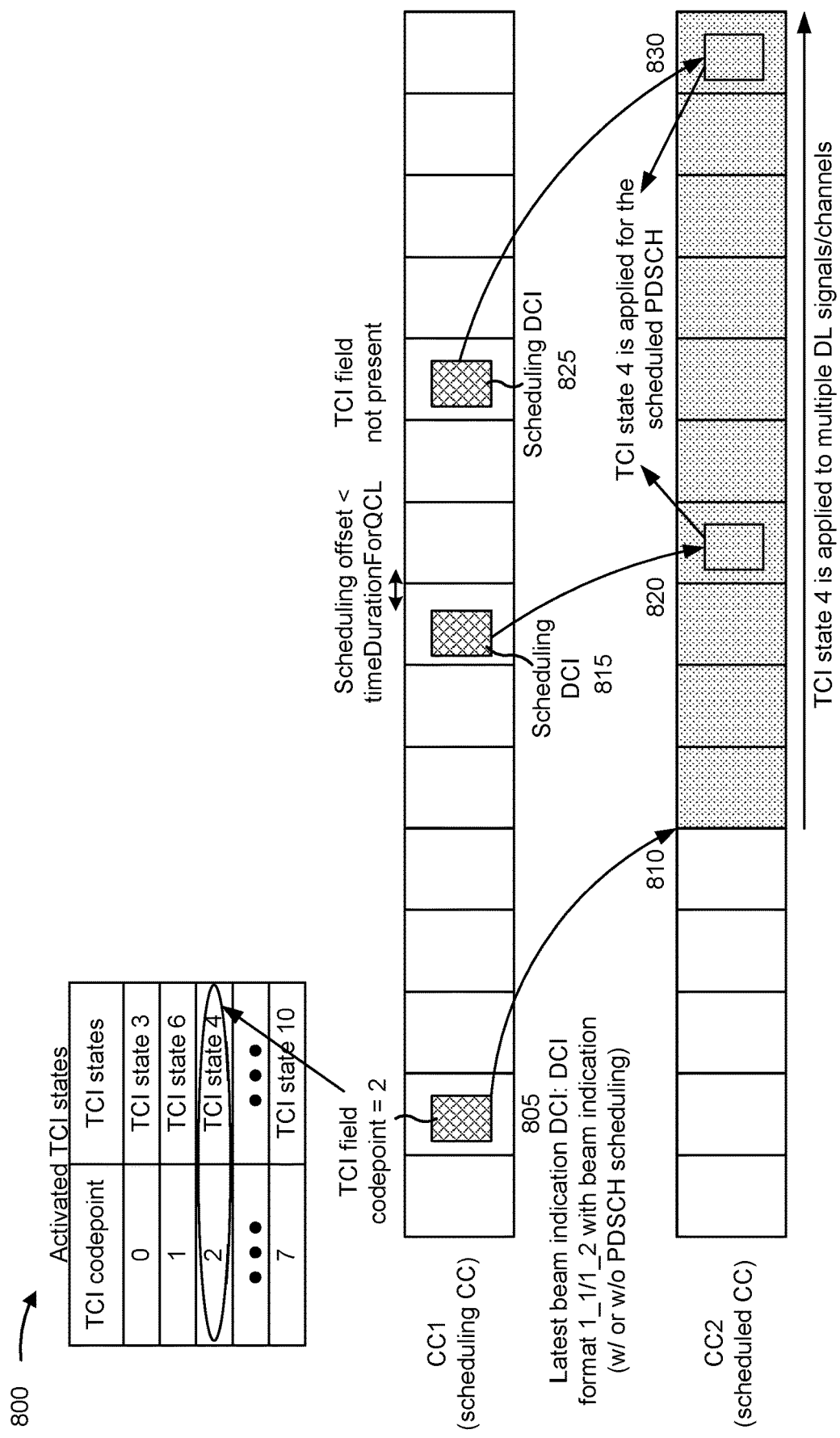

FIG. 8 is a diagram illustrating an example 800 associated with a default beam for cross-carrier scheduling with a unified TCI, in accordance with the present disclosure. As shown in FIG. 8, example 800 includes communications between a network node (e.g., network node 705, base station 110, CU 310, DU 330, RU 340, or a combination thereof) and a UE (e.g., UE 120) in a first CC (CC1) and a second CC (CC2). CC1 may be a scheduling CC, and the UE may be configured with CORESET in CC1 to monitor for PDCCH communications. CC2 may be configured with cross-carrier scheduling, and the UE may not be configured with any CORESETs in CC2. CC2 may be a scheduled CC for one or more PDSCH communications scheduled by DCI transmitted to the UE in CC1 (e.g., the scheduling CC). CC2 may be configured with unified TCI.

As shown in FIG. 8, the UE beam may receive, from the network node, beam indication DCI 805 in CC1 that indicates a TCI state to be applied to downlink signals and channels (or to downlink and uplink signals and channels) in CC2 starting from a starting time 810 associated with the beam indication DCI 805. The beam indication DCI 805 may be DCI format 1_1/1_2 with or without PDSCH scheduling information. The beam indication DCI 805 may indicate a TCI field codepoint that maps to a TCI state in a set of activated TCI states for the UE. For example, as shown in FIG. 8, the beam indication DCI may indicate a TCI field codepoint of 2, which maps to TCI state 4. The starting time 810 associated with the beam indication DCI may be start at a first slot at least a configured number (Y) of symbols after a last symbol of a PUCCH communication that includes the HARQ-ACK feedback for the beam indication DCI 805. The UE may start applying the TCI state (e.g., TCI state 4) indicated in the beam indication DCI 805 at the start time 810, and the UE may apply the indicated TCI state (e.g., TCI state 4) to multiple downlink signals and channels in CC2. For example, the UE may apply the indicated TCI state (e.g., TCI state 4) to downlink signals and channels in CC2 from the starting time 810 until the UE receives an indication of a different TCI state in another beam indication DCI.

As further shown in FIG. 8, the UE may receive, from the network node, scheduling DCI 815 in CC1 that schedules a PDSCH communication 820 in CC2. The scheduling offset between the scheduling DCI 815 and the scheduled PDSCH communication 820 may be less than a time duration threshold (e.g., the scheduling offset may be less than timeDurationforQCL), which may trigger the UE to receive the scheduled PDSCH communication 820 using a default beam. In some aspects, the default beam for the receiving the PDSCH communication 820 may be a default beam associated with the TCI state (e.g., TCI state 4) indicated in the latest beam indication DCI 805.

As further shown in FIG. 8, the UE may receive, from the network node, scheduling DCI 825 in CC1 that schedules a PDSCH communication 830 in CC2. The TCI field may not be present in the scheduling DCI 825, which may trigger the UE to receive the scheduled PDSCH communication 830 using a default beam. In some aspects, the default beam for the receiving the PDSCH 830 may be a default beam associated with the TCI state (e.g., TCI state 4) indicated in the latest beam indication DCI 805.

As shown FIG. 8, the UE may use a beam associated with TCI state 4 as the default beam for receiving the PDSCH communications 820 and 830 in CC2, because TCI state 4 was indicated (e.g., using the TCI field codepoint of 2) in the latest beam indication DCI 805. However, in the example of FIG. 8, TCI state 3 is the TCI state with the lowest TCI state ID among the set of activated TCI states. In some aspects, the UE may use the beam associated with the indicated TCI state (e.g., TCI 4) in the latest beam indication DCI (e.g., beam indication DCI 805), even in a case in which the indicated TCI state (e.g., TCI state 4) is not the activated TCI state with the lowest TCI state ID (e.g., TCI state 3).

As indicated above, FIG. 8 is provided as an example. Other examples may differ from what is described with respect to FIG. 8.

Figure 9:
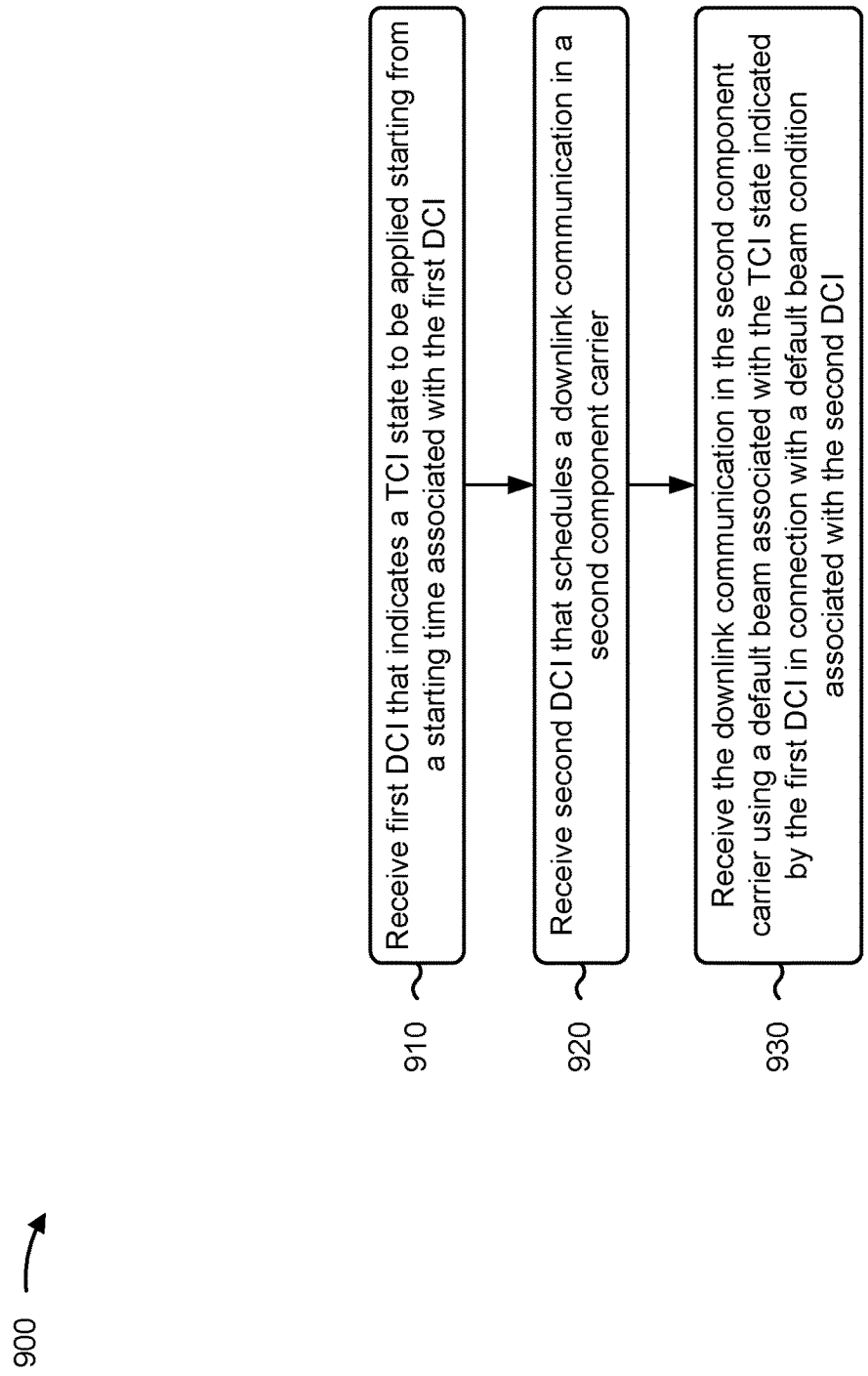
FIGS. 9-10 are diagrams illustrating example processes associated with a default beam for cross-carrier scheduling with a unified TCI, in accordance with the present disclosure.

FIG. 9 is a diagram illustrating an example process 900 performed, for example, by a UE, in accordance with the present disclosure. Example process 900 is an example where the UE (e.g., UE 120) performs operations associated with a default beam for cross-carrier scheduling with unified TCI.

As shown in FIG. 9, in some aspects, process 900 may include receiving first DCI that indicates a TCI state to be applied starting from a starting time associated with the first DCI (block 910). For example, the UE (e.g., using communication manager 140 and/or reception component 1102, depicted in FIG. 11) may receive first DCI that indicates a TCI state to be applied starting from a starting time associated with the first DCI, as described above.

As further shown in FIG. 9, in some aspects, process 900 may include receiving, in a first component carrier, second DCI that schedules a downlink communication in a second component carrier (block 920). For example, the UE (e.g., using communication manager 140 and/or reception component 1102, depicted in FIG. 11) may receive, in a first component carrier, second DCI that schedules a downlink communication in a second component carrier, as described above.

As further shown in FIG. 9, in some aspects, process 900 may include receiving the downlink communication in the second component carrier using a default beam associated with the TCI state indicated by the first DCI in connection with a default beam condition associated with the second DCI (block 930). For example, the UE (e.g., using communication manager 140 and/or reception component 1102, depicted in FIG. 11) may receive the downlink communication in the second component carrier using a default beam associated with the TCI state indicated by the first DCI in connection with a default beam condition associated with the second DCI, as described above.

Process 900 may include additional aspects, such as any single aspect or any combination of aspects described below and/or in connection with one or more other processes described elsewhere herein.

In a first aspect, receiving the first DCI includes receiving the first DCI in the first component carrier.

In a second aspect, the TCI state indicated by the first DCI is a TCI state to be applied in the second component carrier from the starting time associated with the first DCI.

In a third aspect, receiving the downlink communication in the second component carrier using the default beam associated with the TCI state indicated by the first DCI in connection with the default beam condition associated with the second DCI includes receiving the downlink communication in the second component carrier using the default beam associated with the TCI state indicated by the first DCI in connection with a scheduling offset between the second DCI and the downlink communication being less than a time duration threshold.

In a fourth aspect, the time duration threshold is based at least in part on a time duration for QCL.

In a fifth aspect, the time duration for QCL is associated with QCL-TypeD.

In a sixth aspect, a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

In a seventh aspect, receiving the downlink communication in the second component carrier using the default beam associated with the TCI state indicated by the first DCI in connection with the default beam condition associated with the second DCI includes receiving the downlink communication in the second component carrier using the default beam associated with the TCI state indicated by the first DCI in connection with a TCI field being absent from the second DCI.

In an eighth aspect, the TCI state indicated by the first DCI is not a TCI state associated with a lowest TCI state identifier in a set of activated TCI states for the UE.

In a ninth aspect, the starting time associated with the first DCI is a first slot that is at least a configured number of symbols after an uplink communication that includes HARQ-ACK feedback associated with the first DCI.

In a tenth aspect, the downlink communication scheduled by the second DCI is a PDSCH communication in the second component carrier.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
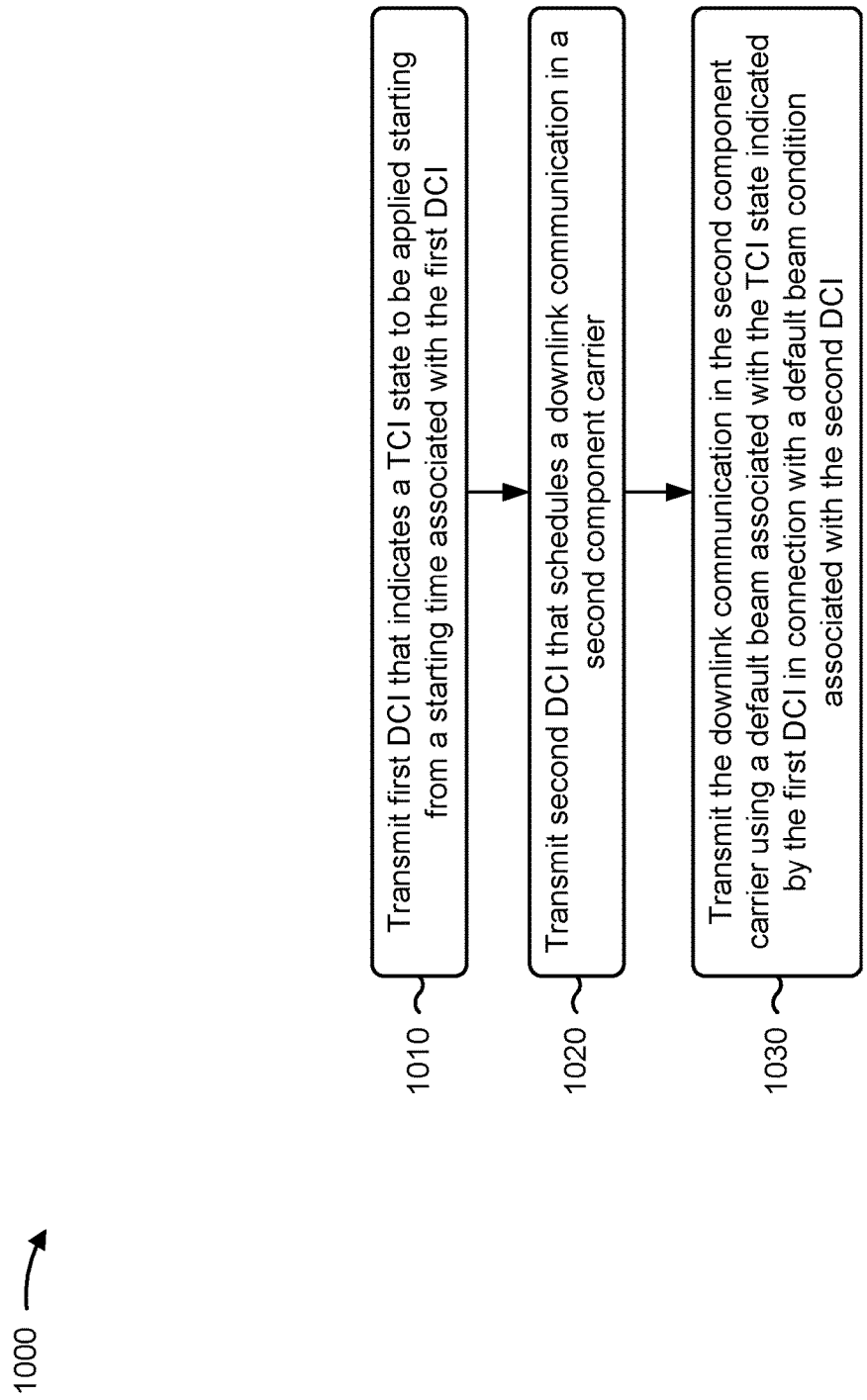

FIG. 10 is a diagram illustrating an example process 1000 performed, for example, by a network node, in accordance with the present disclosure. Example process 1000 is an example where the network node (e.g., network node 705) performs operations associated with a default beam for cross-carrier scheduling with unified TCI.

As shown in FIG. 10, in some aspects, process 1000 may include transmitting, to a UE, first DCI that indicates a TCI state to be applied starting from a starting time associated with the first DCI (block 1010). For example, the network node (e.g., using communication manager 1208 and/or transmission component 1204, depicted in FIG. 12) may transmit, to a UE, first DCI that indicates a TCI state to be applied starting from a starting time associated with the first DCI, as described above.

As further shown in FIG. 10, in some aspects, process 1000 may include transmitting, to the UE in a first component carrier, second DCI that schedules a downlink communication in a second component carrier (block 1020). For example, the network node (e.g., using communication manager 1208 and/or transmission component 1204, depicted in FIG. 12) may transmit, to the UE in a first component carrier, second DCI that schedules a downlink communication in a second component carrier, as described above.

As further shown in FIG. 10, in some aspects, process 1000 may include transmitting the downlink communication in the second component carrier using a default beam associated with the TCI state indicated by the first DCI in connection with a default beam condition associated with the second DCI (block 1030). For example, the network node (e.g., using communication manager 1208 and/or transmission component 1204, depicted in FIG. 12) may transmit the downlink communication in the second component carrier using a default beam associated with the TCI state indicated by the first DCI in connection with a default beam condition associated with the second DCI, as described above.

Process 1000 may include additional aspects, such as any single aspect or any combination of aspects described below and/or in connection with one or more other processes described elsewhere herein.

In a first aspect, transmitting the first DCI includes transmitting the first DCI in the first component carrier.

In a second aspect, the TCI state indicated by the first DCI is a TCI state to be applied in the second component carrier from the starting time associated with the first DCI.

In a third aspect, transmitting the downlink communication in the second component carrier using the default beam associated with the TCI state indicated by the first DCI in connection with the default beam condition associated with the second DCI includes transmitting the downlink communication in the second component carrier using the default beam associated with the TCI state indicated by the first DCI in connection with a scheduling offset between the second DCI and the downlink communication being less than a time duration threshold.

In a fourth aspect, the time duration threshold is based at least in part on a time duration for QCL.

In a fifth aspect, the time duration for QCL is associated with QCL-TypeD.

In a sixth aspect, a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

In a seventh aspect, transmitting the downlink communication in the second component carrier using the default beam associated with the TCI state indicated by the first DCI in connection with the default beam condition associated with the second DCI includes transmitting the downlink communication in the second component carrier using the default beam associated with the TCI state indicated by the first DCI in connection with a TCI field being absent from the second DCI.

In an eighth aspect, the TCI state indicated by the first DCI is not a TCI state associated with a lowest TCI state identifier in a set of activated TCI states for the UE.

In a ninth aspect, the starting time associated with the first DCI is a first slot that is at least a configured number of symbols after an uplink communication that includes HARQ-ACK feedback associated with the first DCI.

In a tenth aspect, the downlink communication scheduled by the second DCI is a PDSCH communication in the second component carrier.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
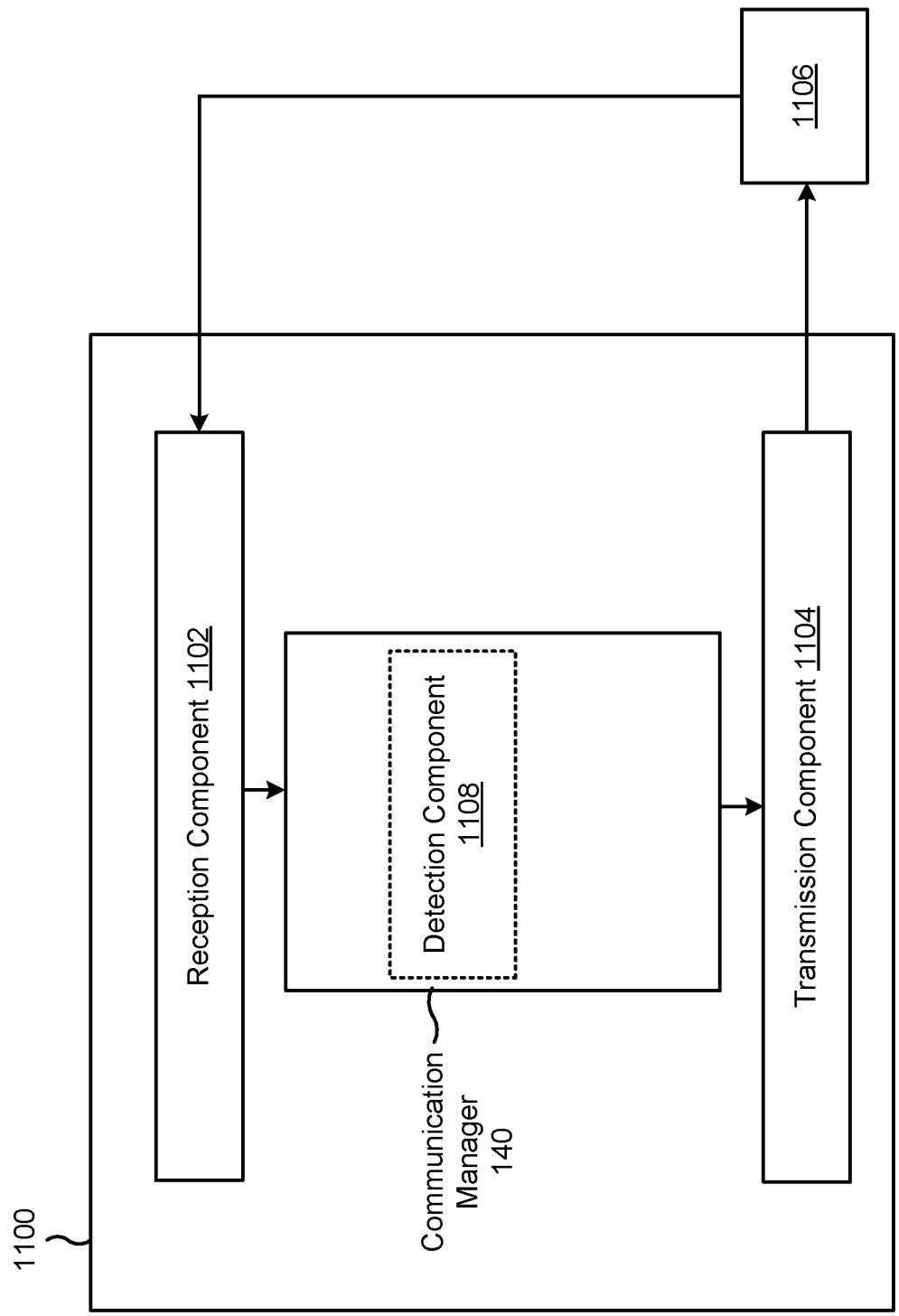
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a detection component 1108, among other examples.

In some aspects, the apparatus 1100 may be configured to perform one or more operations described herein in connection with FIGS. 7-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive first DCI that indicates a TCI state to be applied starting from a starting time associated with the first DCI. The reception component 1102 may receive, in a first component carrier, second DCI that schedules a downlink communication in a second component carrier. The reception component 1102 may receive the downlink communication in the second component carrier using a default beam associated with the TCI state indicated by the first DCI in connection with a default beam condition associated with the second DCI. The detection component 1108 may detect the default beam condition associated with the second DCI.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
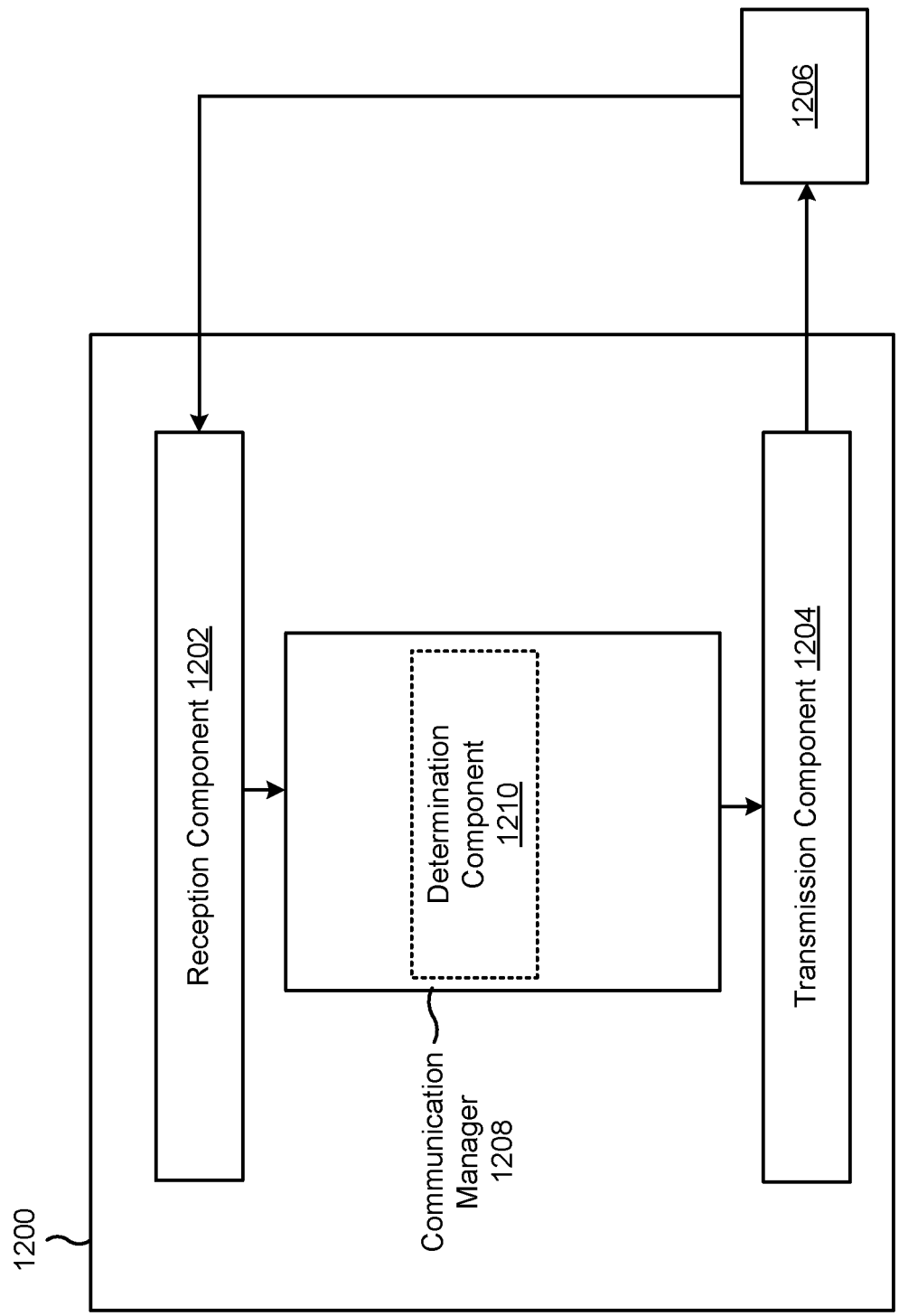

FIG. 12 is a diagram of an example apparatus 1200 for wireless communication. The apparatus 1200 may be a network node, or a network node may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 1208. The communication manager 1208 may include a determination component 1210, among other examples.

In some aspects, the apparatus 1200 may be configured to perform one or more operations described herein in connection with FIGS. 7-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The communication manager 1208 may control and/or otherwise manage one or more operations of the reception component 1202 and/or the transmission component 1204. In some aspects, the communication manager 1208 may include one or more antennas, a modem, a controller/processor, a memory, or a combination thereof, of the base station described in connection with FIG. 2. The communication manager 1208 may be, or be similar to, the communication manager 150 depicted in FIGS. 1 and 2. For example, in some aspects, the communication manager 1208 may be configured to perform one or more of the functions described as being performed by the communication manager 150. In some aspects, the communication manager 1208 may include the reception component 1202 and/or the transmission component 1204.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The transmission component 1204 may transmit, to a UE, first DCI that indicates a TCI state to be applied starting from a starting time associated with the first DCI. The transmission component 1204 may transmit, to the UE in a first component carrier, second DCI that schedules a downlink communication in a second component carrier. The transmission component 1204 may transmit the downlink communication in the second component carrier using a default beam associated with the TCI state indicated by the first DCI in connection with a default beam condition associated with the second DCI. The determination component 1210 may determine the TCI state to be indicated by the first DCI and/or scheduling information for the downlink communication to be included in the second DCI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving first downlink control information (DCI) that indicates a transmission configuration indicator (TCI) state to be applied starting from a starting time associated with the first DCI; receiving, in a first component carrier, second DCI that schedules a downlink communication in a second component carrier; and receiving the downlink communication in the second component carrier using a default beam associated with the TCI state indicated by the first DCI in connection with a default beam condition associated with the second DCI.

Aspect 2: The method of Aspect 1, wherein receiving the first DCI comprises: receiving the first DCI in the first component carrier.

Aspect 3: The method of any of Aspects 1-2, wherein the TCI state indicated by the first DCI is a TCI state to be applied in the second component carrier from the starting time associated with the first DCI.

Aspect 4: The method of any of Aspects 1-3, wherein receiving the downlink communication in the second component carrier using the default beam associated with the TCI state indicated by the first DCI in connection with the default beam condition associated with the second DCI comprises: receiving the downlink communication in the second component carrier using the default beam associated with the TCI state indicated by the first DCI in connection with a scheduling offset between the second DCI and the downlink communication being less than a time duration threshold.

Aspect 5: The method of Aspect 4, wherein the time duration threshold is based at least in part on a time duration for quasi co-location (QCL).

Aspect 6: The method of Aspect 5, wherein the time duration for QCL is associated with QCL-TypeD.

Aspect 7: The any of Aspects of Aspect 5-6, wherein a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

Aspect 8: The method of any of Aspects 1-3, wherein receiving the downlink communication in the second component carrier using the default beam associated with the TCI state indicated by the first DCI in connection with the default beam condition associated with the second DCI comprises: receiving the downlink communication in the second component carrier using the default beam associated with the TCI state indicated by the first DCI in connection with a TCI field being absent from the second DCI.

Aspect 9: The method of any of Aspects 1-8, wherein the TCI state indicated by the first DCI is not a TCI state associated with a lowest TCI state identifier in a set of activated TCI states for the UE.

Aspect 10: The method of any of Aspects 1-9, wherein the starting time associated with the first DCI is a first slot that is at least a configured number of symbols after an uplink communication that includes hybrid automated repeat response acknowledgement (HARQ-ACK) feedback associated with the first DCI.

Aspect 11: The method of any of Aspects 1-10, wherein the downlink communication scheduled by the second DCI is a physical downlink shared channel (PDSCH) communication in the second component carrier.

Aspect 12: A method of wireless communication performed by a network node, comprising: transmitting, to a user equipment (UE), first downlink control information (DCI) that indicates a transmission configuration indicator (TCI) state to be applied starting from a starting time associated with the first DCI; transmitting, to the UE in a first component carrier, second DCI that schedules a downlink communication in a second component carrier; and transmitting the downlink communication in the second component carrier using a default beam associated with the TCI state indicated by the first DCI in connection with a default beam condition associated with the second DCI.

Aspect 13: The method of Aspect 12, wherein transmitting the first DCI comprises: transmitting the first DCI in the first component carrier.

Aspect 14: The method of any of Aspects 12-13, wherein the TCI state indicated by the first DCI is a TCI state to be applied in the second component carrier from the starting time associated with the first DCI.

Aspect 15: The method of any of Aspects 12-14, wherein transmitting the downlink communication in the second component carrier using the default beam associated with the TCI state indicated by the first DCI in connection with the default beam condition associated with the second DCI comprises: transmitting the downlink communication in the second component carrier using the default beam associated with the TCI state indicated by the first DCI in connection with a scheduling offset between the second DCI and the downlink communication being less than a time duration threshold.

Aspect 16: The method of Aspect 15, wherein the time duration threshold is based at least in part on a time duration for quasi co-location (QCL).

Aspect 17: The method of Aspect 16, wherein the time duration for QCL is associated with QCL-TypeD.

Aspect 18: The method of any of Aspects 16-17, wherein a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

Aspect 19: The method of any of Aspects 12-14, wherein transmitting the downlink communication in the second component carrier using the default beam associated with the TCI state indicated by the first DCI in connection with the default beam condition associated with the second DCI comprises: transmitting the downlink communication in the second component carrier using the default beam associated with the TCI state indicated by the first DCI in connection with a TCI field being absent from the second DCI.

Aspect 20: The method of any of Aspects 12-19, wherein the TCI state indicated by the first DCI is not a TCI state associated with a lowest TCI state identifier in a set of activated TCI states for the UE.

Aspect 21: The method of any of Aspects 12-20, wherein the starting time associated with the first DCI is a first slot that is at least a configured number of symbols after an uplink communication that includes hybrid automated repeat response acknowledgement (HARQ-ACK) feedback associated with the first DCI.

Aspect 22: The method of any of Aspects 12-21, wherein the downlink communication scheduled by the second DCI is a physical downlink shared channel (PDSCH) communication in the second component carrier.

Aspect 23: An apparatus for wireless communication at a device, comprising a processor; memory coupled with the processor; and instructions stored in the memory and executable by the processor to cause the apparatus to perform the method of one or more of Aspects 1-11.

Aspect 24: A device for wireless communication, comprising a memory and one or more processors coupled to the memory, the one or more processors configured to perform the method of one or more of Aspects 1-11.

Aspect 25: An apparatus for wireless communication, comprising at least one means for performing the method of one or more of Aspects 1-11.

Aspect 26: A non-transitory computer-readable medium storing code for wireless communication, the code comprising instructions executable by a processor to perform the method of one or more of Aspects 1-11.

Aspect 27: A non-transitory computer-readable medium storing a set of instructions for wireless communication, the set of instructions comprising one or more instructions that, when executed by one or more processors of a device, cause the device to perform the method of one or more of Aspects 1-11.

Aspect 28: An apparatus for wireless communication at a device, comprising a processor; memory coupled with the processor; and instructions stored in the memory and executable by the processor to cause the apparatus to perform the method of one or more of Aspects 12-22.

Aspect 29: A device for wireless communication, comprising a memory and one or more processors coupled to the memory, the one or more processors configured to perform the method of one or more of Aspects 12-22.

Aspect 30: An apparatus for wireless communication, comprising at least one means for performing the method of one or more of Aspects 12-22.

Aspect 31: A non-transitory computer-readable medium storing code for wireless communication, the code comprising instructions executable by a processor to perform the method of one or more of Aspects 12-22.

Aspect 32: A non-transitory computer-readable medium storing a set of instructions for wireless communication, the set of instructions comprising one or more instructions that, when executed by one or more processors of a device, cause the device to perform the method of one or more of Aspects 12-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive first downlink control information (DCI) that indicates a transmission configuration indicator (TCI) state to be applied starting from a starting time associated with the first DCI;
receive, in a first component carrier, second DCI that schedules a downlink communication in a second component carrier, wherein the TCI state indicated by the first DCI is to be applied in the second component carrier from the starting time associated with the first DCI; and
receive the downlink communication in the second component carrier using a default beam associated with the TCI state indicated by the first DCI in connection with a default beam condition associated with the second DCI.

2. The UE of claim 1, wherein the one or more processors, to receive the first DCI, are configured to:
receive the first DCI in the first component carrier.

3. The UE of claim 1, wherein the one or more processors, to receive the downlink communication in the second component carrier using the default beam associated with the TCI state indicated by the first DCI in connection with the default beam condition associated with the second DCI, are configured to:
receive the downlink communication in the second component carrier using the default beam associated with the TCI state indicated by the first DCI in connection with a scheduling offset between the second DCI and the downlink communication being less than a time duration threshold.

4. The UE of claim 3, wherein the time duration threshold is based at least in part on a time duration for quasi co-location (QCL).

5. The UE of claim 4, wherein the time duration for QCL is associated with QCL-TypeD.

6. The UE of claim 4, wherein a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

7. The UE of claim 1, wherein the one or more processors, to receive the downlink communication in the second component carrier using the default beam associated with the TCI state indicated by the first DCI in connection with the default beam condition associated with the second DCI, are configured to:
receive the downlink communication in the second component carrier using the default beam associated with the TCI state indicated by the first DCI in connection with a TCI field being absent from the second DCI.

8. The UE of claim 1, wherein the TCI state indicated by the first DCI is not a TCI state associated with a lowest TCI state identifier in a set of activated TCI states for the UE.

9. The UE of claim 1, wherein the starting time associated with the first DCI is a first slot that is at least a configured number of symbols after an uplink communication that includes hybrid automated repeat response acknowledgement (HARQ-ACK) feedback associated with the first DCI.

10. The UE of claim 1, wherein the downlink communication scheduled by the second DCI is a physical downlink shared channel (PDSCH) communication in the second component carrier.

11. A network node for wireless communication, comprising:
one or more memories; and
one or more processors, coupled to the one or more memories, configured to:
transmit, to a user equipment (UE), first downlink control information (DCI) that indicates a transmission configuration indicator (TCI) state to be applied starting from a starting time associated with the first DCI;
transmit, to the UE in a first component carrier, second DCI that schedules a downlink communication in a second component carrier, wherein the TCI state indicated by the first DCI is to be applied in the second component carrier from the starting time associated with the first DCI; and
transmit the downlink communication in the second component carrier using a default beam associated with the TCI state indicated by the first DCI in connection with a default beam condition associated with the second DCI.

12. The network node of claim 11, wherein the one or more processors, to transmit the first DCI, are configured to:
transmit the first DCI in the first component carrier.

13. The network node of claim 11, wherein the one or more processors, to transmit the downlink communication in the second component carrier using the default beam associated with the TCI state indicated by the first DCI in connection with the default beam condition associated with the second DCI, are configured to:
transmit the downlink communication in the second component carrier using the default beam associated with the TCI state indicated by the first DCI in connection with a scheduling offset between the second DCI and the downlink communication being less than a time duration threshold.

14. The network node of claim 13, wherein the time duration threshold is based at least in part on a time duration for quasi co-location (QCL).

15. The network node of claim 14, wherein the time duration for QCL is associated with QCL-TypeD.

16. The network node of claim 14, wherein a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

17. The network node of claim 11, wherein the one or more processors, to transmit the downlink communication in the second component carrier using the default beam associated with the TCI state indicated by the first DCI in connection with the default beam condition associated with the second DCI, are configured to:
transmit the downlink communication in the second component carrier using the default beam associated with the TCI state indicated by the first DCI in connection with a TCI field being absent from the second DCI.

18. The network node of claim 11, wherein the TCI state indicated by the first DCI is not a TCI state associated with a lowest TCI state identifier in a set of activated TCI states for the UE.

19. The network node of claim 11, wherein the starting time associated with the first DCI is a first slot that is at least a configured number of symbols after an uplink communication that includes hybrid automated repeat response acknowledgement (HARQ-ACK) feedback associated with the first DCI.

20. The network node of claim 11, wherein the downlink communication scheduled by the second DCI is a physical downlink shared channel (PDSCH) communication in the second component carrier.

21. A method of wireless communication performed by a user equipment (UE), comprising:
receiving first downlink control information (DCI) that indicates a transmission configuration indicator (TCI) state to be applied starting from a starting time associated with the first DCI;
receiving, in a first component carrier, second DCI that schedules a downlink communication in a second component carrier, wherein the TCI state indicated by the first DCI is to be applied in the second component carrier from the starting time associated with the first DCI; and
receiving the downlink communication in the second component carrier using a default beam associated with the TCI state indicated by the first DCI in connection with a default beam condition associated with the second DCI.

22. The method of claim 21, wherein receiving the downlink communication in the second component carrier using the default beam associated with the TCI state indicated by the first DCI in connection with the default beam condition associated with the second DCI comprises:
receiving the downlink communication in the second component carrier using the default beam associated with the TCI state indicated by the first DCI in connection with a scheduling offset between the second DCI and the downlink communication being less than a time duration threshold.

23. The method of claim 22, wherein the time duration threshold is associated with a quasi co-location (QCL)-TypeD.

24. The method of claim 22, wherein the time duration threshold is based at least in part on a time duration for quasi co-location (QCL).

25. The method of claim 24, wherein a first subcarrier spacing of the first component carrier is different from a second subcarrier spacing of the second component carrier, and the time duration threshold is a sum of the time duration for QCL and a delay associated the first subcarrier spacing and the second subcarrier spacing being different.

26. The method of claim 21, wherein receiving the downlink communication in the second component carrier using the default beam associated with the TCI state indicated by the first DCI in connection with the default beam condition associated with the second DCI comprises:
receiving the downlink communication in the second component carrier using the default beam associated with the TCI state indicated by the first DCI in connection with a TCI field being absent from the second DCI.

27. The method of claim 21, wherein the TCI state indicated by the first DCI is not a TCI state associated with a lowest TCI state identifier in a set of activated TCI states for the UE.

28. A method of wireless communication performed by a network node, comprising:
transmitting, to a user equipment (UE), first downlink control information (DCI) that indicates a transmission configuration indicator (TCI) state to be applied starting from a starting time associated with the first DCI;
transmitting, to the UE in a first component carrier, second DCI that schedules a downlink communication in a second component carrier, wherein the TCI state indicated by the first DCI is to be applied in the second component carrier from the starting time associated with the first DCI; and
transmitting the downlink communication in the second component carrier using a default beam associated with the TCI state indicated by the first DCI in connection with a default beam condition associated with the second DCI.

29. The method of claim 28, wherein the default beam condition is associated with a time duration threshold, and wherein the time duration threshold is associated with a quasi co-location (QCL)-TypeD.

* * * * *